United States Patent
Li et al.

(10) Patent No.: US 12,207,166 B2
(45) Date of Patent: Jan. 21, 2025

(54) HUMAN ASSISTED LIVE OPERATIONS SYSTEMS AND METHODS

(71) Applicant: GM Cruise Holdings LLC, San Francisco, CA (US)

(72) Inventors: Qingxuan Li, San Mateo, CA (US); Theresa Foy, San Francisco, CA (US); Christopher Warren, Seattle, WA (US); Livia Johanna, San Francisco, CA (US); Bharatkumar Patel, Fremont, CA (US); Leah Meyerholtz, San Francisco, CA (US); David J. Shuckerow, Seattle, WA (US); MinJie Tong, Issaquah, WA (US); Vinayaka Dattatraya, Mill Creek, WA (US); Kendal Sparks, New York, NY (US); McKenna Morey, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 198 days.

(21) Appl. No.: 17/946,895

(22) Filed: Sep. 16, 2022

(65) Prior Publication Data
US 2024/0092389 A1     Mar. 21, 2024

Related U.S. Application Data

(63) Continuation of application No. 17/946,741, filed on Sep. 16, 2022.

(51) Int. Cl.
  *H04W 4/40* (2018.01)
  *B60W 50/14* (2020.01)
  (Continued)

(52) U.S. Cl.
  CPC .............. *H04W 4/40* (2018.02); *B60W 50/14* (2013.01); *B60W 60/0015* (2020.02);
  (Continued)

(58) Field of Classification Search
  CPC ................. B60W 40/02; B60W 50/14; B60W 2050/146; B60W 60/00253;
  (Continued)

(56) References Cited

U.S. PATENT DOCUMENTS

2019/0066407 A1*  2/2019  Kwak ................... G07C 5/008
2019/0187691 A1*  6/2019  Magzimof .......... B60W 60/007
(Continued)

FOREIGN PATENT DOCUMENTS

WO     2023048717 A1     3/2023

*Primary Examiner* — Russell Frejd
*Assistant Examiner* — Brandon Z Willis
(74) *Attorney, Agent, or Firm* — Wade C. Yamazaki

(57) ABSTRACT

There is disclosed a method of operating an autonomous vehicle (AV), including: detecting an alert condition within the AV via data from an electronic sensor suite of the AV; based at least in part on detecting the alert condition, automatically initiating a call with another party; and communicatively coupling a passenger of the AV to the conference call, whereby the passenger can communicate with the other party via the conference call.

20 Claims, 12 Drawing Sheets

(51) Int. Cl.
  *B60W 60/00* (2020.01)
  *G06F 3/0481* (2022.01)
  *G06F 3/0484* (2022.01)
  *G06F 3/16* (2006.01)
  *G06V 40/20* (2022.01)
  *G09B 21/00* (2006.01)
  *G10L 13/02* (2013.01)
  *G10L 15/00* (2013.01)
  *G10L 15/08* (2006.01)
  *G10L 15/18* (2013.01)
  *G10L 15/22* (2006.01)
  *G10L 25/51* (2013.01)
  *H04M 3/51* (2006.01)
  *H04M 3/56* (2006.01)
  *H04N 7/18* (2006.01)

(52) U.S. Cl.
  CPC ..... *B60W 60/00253* (2020.02); *G06F 3/0481* (2013.01); *G06F 3/0484* (2013.01); *G06F 3/165* (2013.01); *G06V 40/28* (2022.01); *G09B 21/006* (2013.01); *G09B 21/009* (2013.01); *G10L 13/02* (2013.01); *G10L 15/005* (2013.01); *G10L 15/18* (2013.01); *G10L 15/22* (2013.01); *G10L 25/51* (2013.01); *H04M 3/51* (2013.01); *H04M 3/56* (2013.01); *H04N 7/181* (2013.01); *B60W 2050/146* (2013.01); *B60W 2420/403* (2013.01); *B60W 2420/54* (2013.01); *B60W 2540/21* (2020.02); *B60W 2540/223* (2020.02); *B60W 2555/20* (2020.02); *B60W 2556/45* (2020.02); *G10L 2015/088* (2013.01)

(58) Field of Classification Search
  CPC ....... B60W 60/0015; B60W 60/00182; B60W 2420/403; B60W 2540/223; B60W 2555/20; B60W 2556/45; G06F 3/0481; G06F 3/0484; G06F 3/165; G06F 3/167; G06F 3/14; H04W 4/40; H04W 4/44; H04N 7/181; G06V 20/56; G06V 20/59; G08G 1/20; G06Q 50/40; G06Q 50/43; G06Q 50/47
  See application file for complete search history.

(56) References Cited

U.S. PATENT DOCUMENTS

| | | | |
|---|---|---|---|
| 2020/0312062 A1* | 10/2020 | Balakrishnan | G08B 21/02 |
| 2021/0133290 A1 | 5/2021 | Makke et al. | |
| 2022/0003561 A1* | 1/2022 | Shoval | G01C 21/3415 |
| 2022/0180072 A1 | 6/2022 | Scalisi et al. | |
| 2023/0111923 A1* | 4/2023 | Schumacher | B60K 35/85 701/36 |
| 2023/0332912 A1 | 10/2023 | Buttolo et al. | |
| 2023/0360163 A1* | 11/2023 | Weissert | G06Q 10/02 |

* cited by examiner

HUMAN ASSISTED LIVE OPERATIONS SYSTEMS AND METHODS

PRIORITY DATA

The present application is a Continuation application of and claims priority to and/or receives benefit from a U.S. non-provisional application Ser. No. 17/946,741 (the '741 application) having the same title and filed on Sep. 16, 2022. The '741 application is hereby incorporated by reference in its entirety.

BACKGROUND

AVs, also known as self-driving cars, driverless vehicles, and ride-hail vehicles, are vehicles that use multiple sensors to sense the environment and move without human input. Automation technology in the AVs enables the vehicles to drive on roadways and to perceive the vehicle's environment accurately and quickly, including obstacles, signs, and traffic lights. The vehicles may be used to pick up passengers and drive the passengers to selected destinations. The vehicles may also be used to pick up packages and/or other goods and deliver the packages and/or goods to selected destinations.

SUMMARY

There is disclosed a method of operating an AV, comprising: detecting an alert condition within the AV via data from an electronic sensor suite of the AV, based at least in part on detecting the alert condition; automatically initiating a call with another party; and communicatively coupling a passenger of the AV to the call, whereby the passenger can communicate with the other party via the call.

BRIEF DESCRIPTION OF THE DRAWINGS

The present disclosure is best understood from the following detailed description when read with the accompanying FIGURES. In accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

DETAILED DESCRIPTION

Overview

Figure 1:
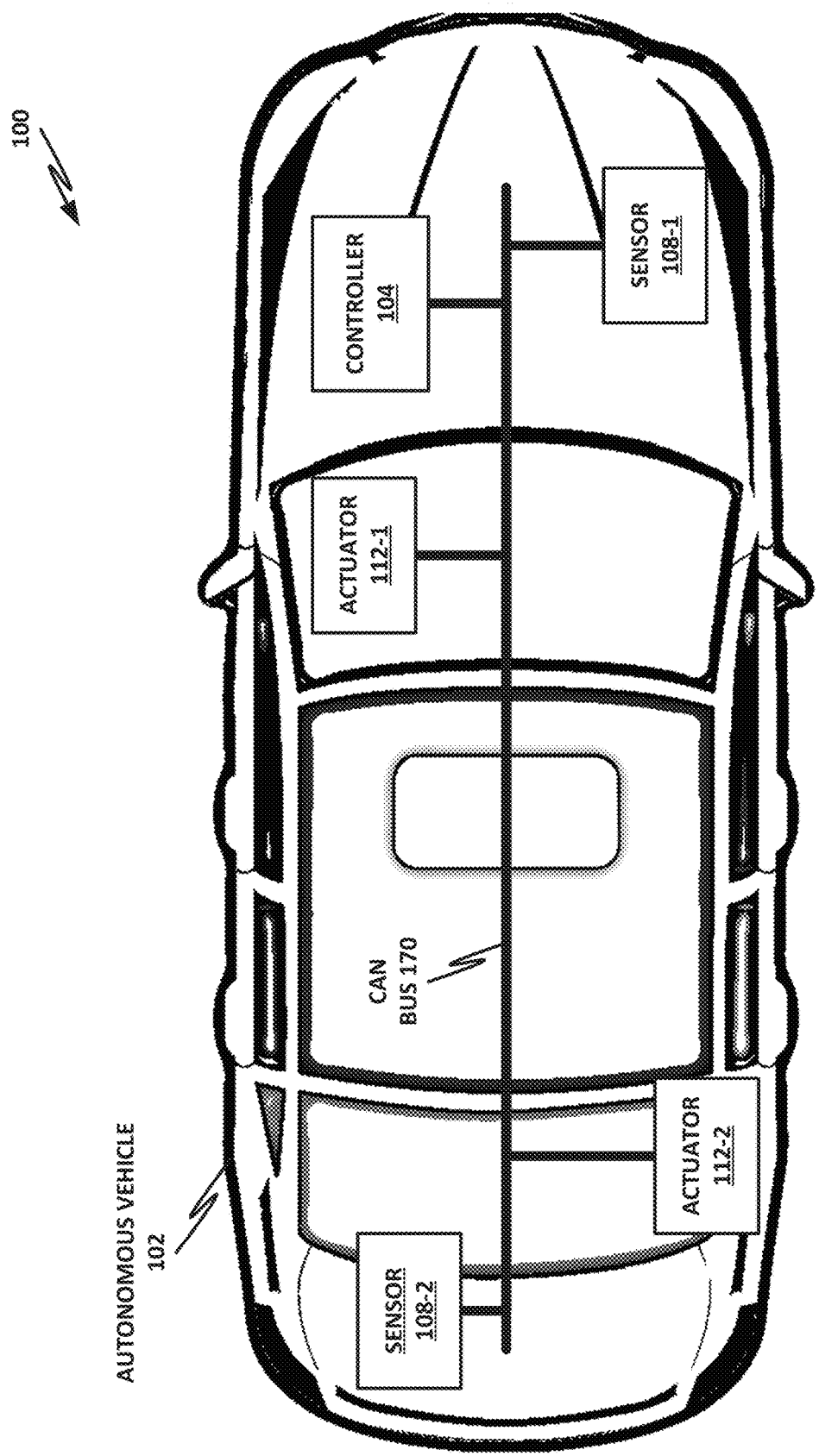
FIG. 1 is a block diagram illustration of selected elements of an AV.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

AVs and vehicles with semi-autonomous features like automatic driver assist systems (ADAS) may include features, such as an onboard assistant. Onboard assistants may handle a range of user interactions, including emergency and non-emergency situations. For example, an onboard assistant may provide a button that a driver or passenger may press to be placed in contact with a service center. Service agents may then speak with the driver or passenger and help address issues or resolve concerns. The onboard assistant may also receive sensor data from the vehicle, and in certain situations may automatically place a call. For example, a call may be placed automatically in the case of a collision, mechanical failure, law enforcement interaction (e.g., the car was pulled over), obstruction, dangerous weather conditions, or similar.

One use case of an AV includes operating a fleet of ride-hail vehicles. These may be ride-hail vehicles that operate without a human driver. As used herein, AV supported ride-hail services may include other services, such as ride-share services and delivery services.

An end user for ride-hail services may install a mobile application on his or her cellular phone or mobile device and may provide profile and/or billing information. Depending on the passenger's privacy preferences, he or she may share additional information that may be used to customize or personalize the ride experience. When the end user needs to go somewhere, he or she may use the ride-hail application to request a ride with a ride-hail vehicle, including a desired destination. The AV operator may have a fleet of ride-hail vehicles and may dispatch a ride-hail vehicle to the end user's destination to pick the passenger up and take him or her to the desired destination.

In the context of a ride-hail vehicle service, an onboard assistant may assume additional significance. As some users may not be familiar or accustomed to ride-hail vehicle services, many users may initially find it unsettling to ride in a car without a human operator, and that may in fact lack human driving equipment altogether (e.g., it may lack a steering wheel, accelerator, brake pedals, etc.). In these cases, the onboard assistant may constitute the sole or at least primary person-to-person interaction for the passenger.

The foregoing may be used to build or embody several exemplary implementations for the onboard assistant and in some cases exemplary implementations for human assisted live operations systems and methods (e.g., systems and methods involving a telephony/communication services with a rider service agent), according to the teachings of the present specification. Services provided by the onboard assistant or enabled by the onboard assistant can significantly improve user experience and efficacy of rider service support. Some example implementations are included here as non-limiting illustrations of these teachings.

Exemplary AV

FIG. 1 is a block diagram 100 illustrating an exemplary AV 102. AV 102 may be, for example, an automobile, car, truck, bus, train, tram, funicular, lift, or similar. AV 102 could also be an autonomous aircraft (fixed wing, rotary, or tiltrotor), ship, watercraft, hover craft, hydrofoil, buggy, cart, golf cart, recreational vehicle, motorcycle, off-road vehicle, three- or four-wheel all-terrain vehicle, or any other vehicle. Except to the extent specifically enumerated in the appended claims, the present specification is not intended to be limited to a particular vehicle or vehicle configuration.

In this example, AV 102 includes one or more sensors, such as sensor 108-1 and sensor 108-2. Sensors 108 may include, by way of illustrative and non-limiting example, localization and driving sensors such as photodetectors, cameras, radio direction and ranging (RADAR), sound navigation and ranging (SONAR), light direction and ranging (LIDAR), GPS, inertial measurement units (IMUs), synchros, accelerometers, microphones, strain gauges, pressure monitors, barometers, thermometers, altimeters, wheel speed sensors, computer vision systems, biometric sensors for operators and/or passengers, or other sensors. In some embodiments, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with dynamically configurable field of view. Embodiments may include a suite of sensors that collect data about the surrounding environment, which may include, by way of illustrative and non-limiting example, a pressure sensor that detects a flat tire on the vehicle. Additional sensors could also include collision sensors, environmental sensors that may detect adverse weather conditions, internal or external cameras that may detect obstructions or dangerous situations (e.g., someone or something is blocking the AV or otherwise threatening the AV), the presence of rain, fog, smoke, and others. In the same or a different embodiment, sensors may be used to identify a rider sentiment and enable an appropriate response to be provided based on the rider sentiment.

AV 102 may further include one or more actuators 112. Actuators 112 may be configured to receive signals and to carry out control functions on AV 102. Actuators 112 may include switches, relays, or mechanical, electrical, pneumatic, hydraulic, or other devices that control the vehicle. In various embodiments, actuators 112 may include steering actuators that control the direction of AV 102, such as by turning a steering wheel, or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes, or braking surfaces. Actuators 112 may further control headlights, indicators, warnings, a car horn, cameras, or other systems or subsystems that affect the operation of AV 102.

A controller 104 may provide the main control logic for AV 102. Controller 104 is illustrated here as a single logical unit and may be implemented as a single device such as an electronic control module (ECM) or other. In various embodiments, one or more functions of controller 104 may be distributed across various physical devices, such as multiple ECMs, one or more hardware accelerators, artificial intelligence (AI) circuits, or other.

Controller 104 may be configured to receive from one or more sensors 108 data to indicate the status or condition of AV 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, AI, pattern recognition, or other algorithms.

Various components of AV 102 may communicate with one another via a bus, such as controller area network (CAN) bus 170. CAN bus 170 is provided as an illustrative embodiment, but other types of buses may be used, including wired, wireless, fiberoptic, infrared, WiFi, Bluetooth, dielectric waveguides, or other types of buses. Bus 170 may implement any suitable protocol. Bus 170 may also enable controller 104, sensors 108, actuators 112, and other systems and subsystems of AV 102 to communicate with external hosts, such as internet-based hosts. In some cases, AV 102 may form a mesh or other cooperative network with other AVs, which may allow sharing of sensor data, control functions, processing ability, or other resources.

Figure 8:
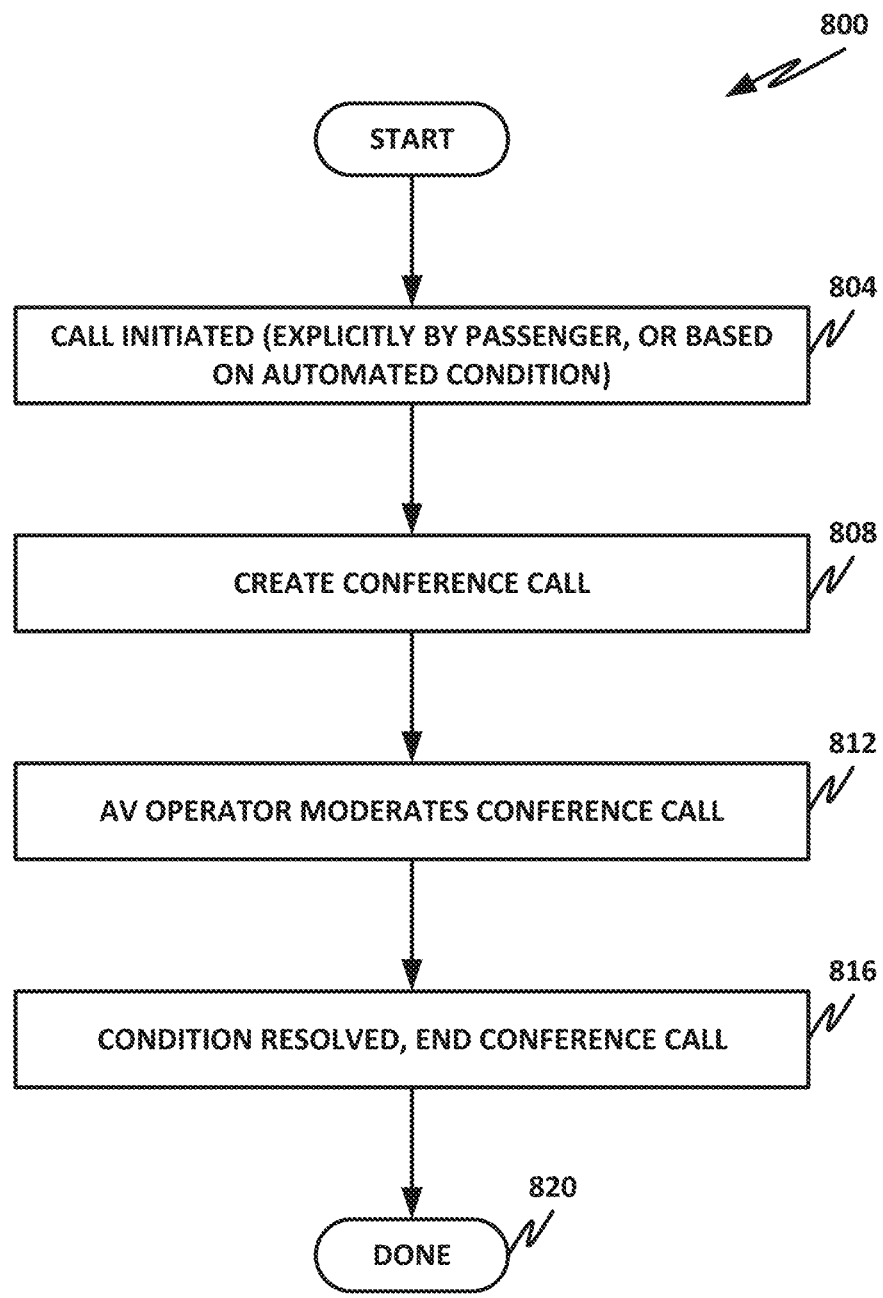
FIG. 8 is a flowchart of a method of selected aspects of providing an onboard assistant.

Controller 104 may control the operations and functionality of AV 102, or one or more other AVs. Controller 104 may receive sensed data from sensors 108, and make onboard decisions based on the sensed data. In some cases, controller 104 may also offload some processing or decision making, such as to a cloud service or accelerator. In some cases, controller 104 is a general-purpose computer adapted for I/O communication with vehicle control systems and sensor systems. Controller 104 may be any suitable computing device. An illustration of a hardware platform is shown in FIG. 8, which may represent a suitable computing platform for controller 104. In some cases, controller 104 may be connected to the internet via a wireless connection (e.g., via a cellular data connection). In some examples, controller 104 is coupled to any number of wireless or wired communication systems. In some examples, controller 104 is coupled to one or more communication systems via a mesh network of devices, such as a mesh network formed by AVs.

According to various implementations, AV 102 may modify and/or set a driving behavior in response to parameters set by vehicle passengers (e.g., via a passenger interface) and/or other interested parties (e.g., via a vehicle coordinator or a remote expert interface). Driving behavior of an AV may be modified according to explicit input or feedback (e.g., a passenger specifying a maximum speed or a relative comfort level), implicit input or feedback (e.g., a passenger's heart rate), or any other suitable data or manner of communicating driving behavior preferences.

AV 102 is illustrated as a fully autonomous automobile but may additionally or alternatively be any semi-autonomous or fully autonomous vehicle. In some cases, AV 102 may switch between a semi-autonomous state and a fully autonomous state and thus, some AVs may have attributes of both a semi-autonomous vehicle and a fully autonomous vehicle depending on the state of the vehicle.

AV 102 may take on other forms, including by way of illustrative and non-limiting example, personal vehicles (which may be fully autonomous, or provide hybrid autonomous/driver assist modes), automated cargo vehicles, delivery drones, autonomous trains, autonomous aircraft, or similar. Any such vehicle may benefit from an onboard assistant as described in this specification.

Exemplary AV Controller

Figure 2:
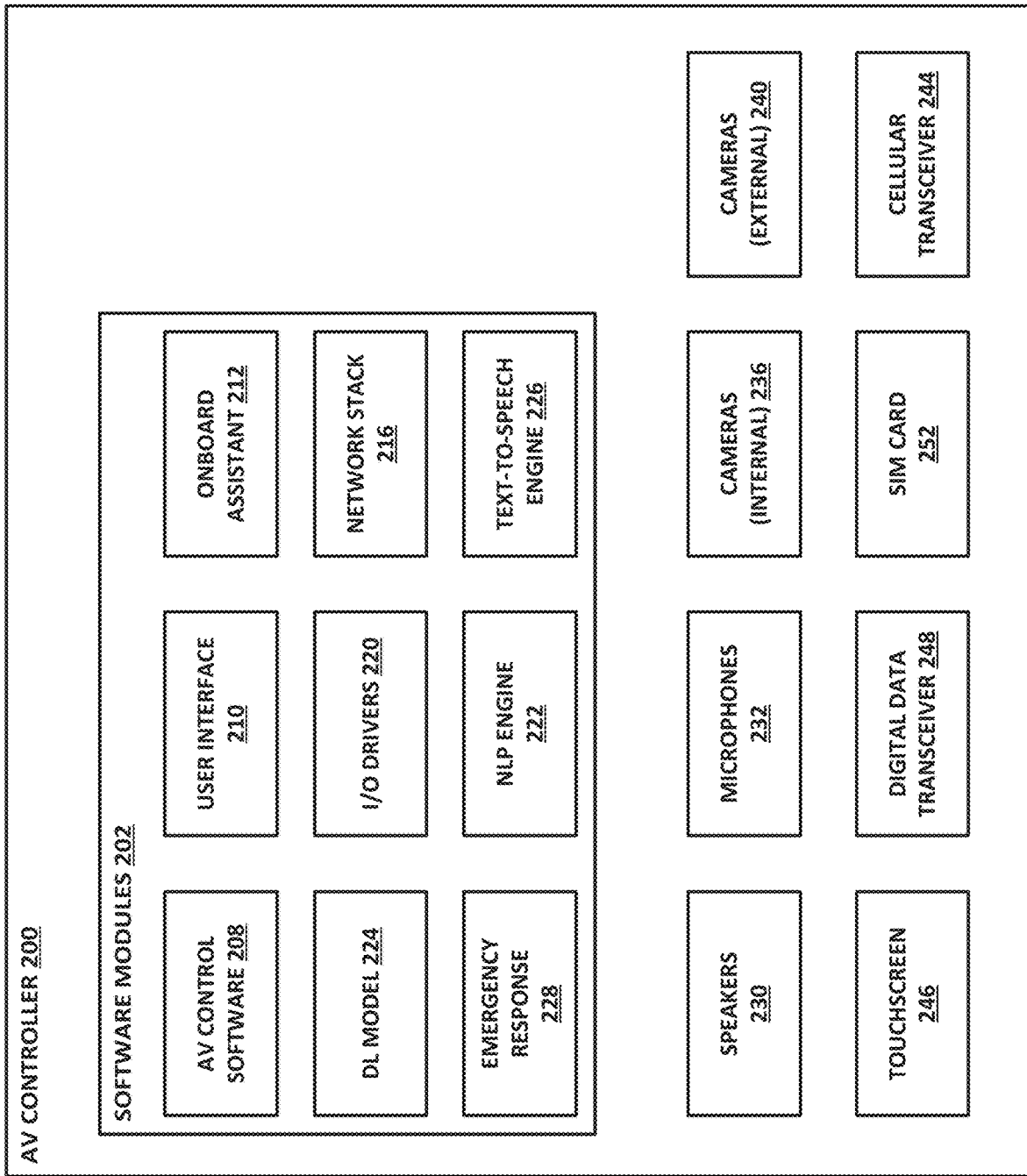
FIG. 2 is a block diagram of selected elements of an AV controller.

FIG. 2 is a block diagram of selected elements of an AV controller 200. Elements disclosed here are selected to illustrate operative principles of the present disclosure. Embodiments may include elements other than those disclosed here, and embodiments need not necessarily include all elements disclosed here.

Figure 12:
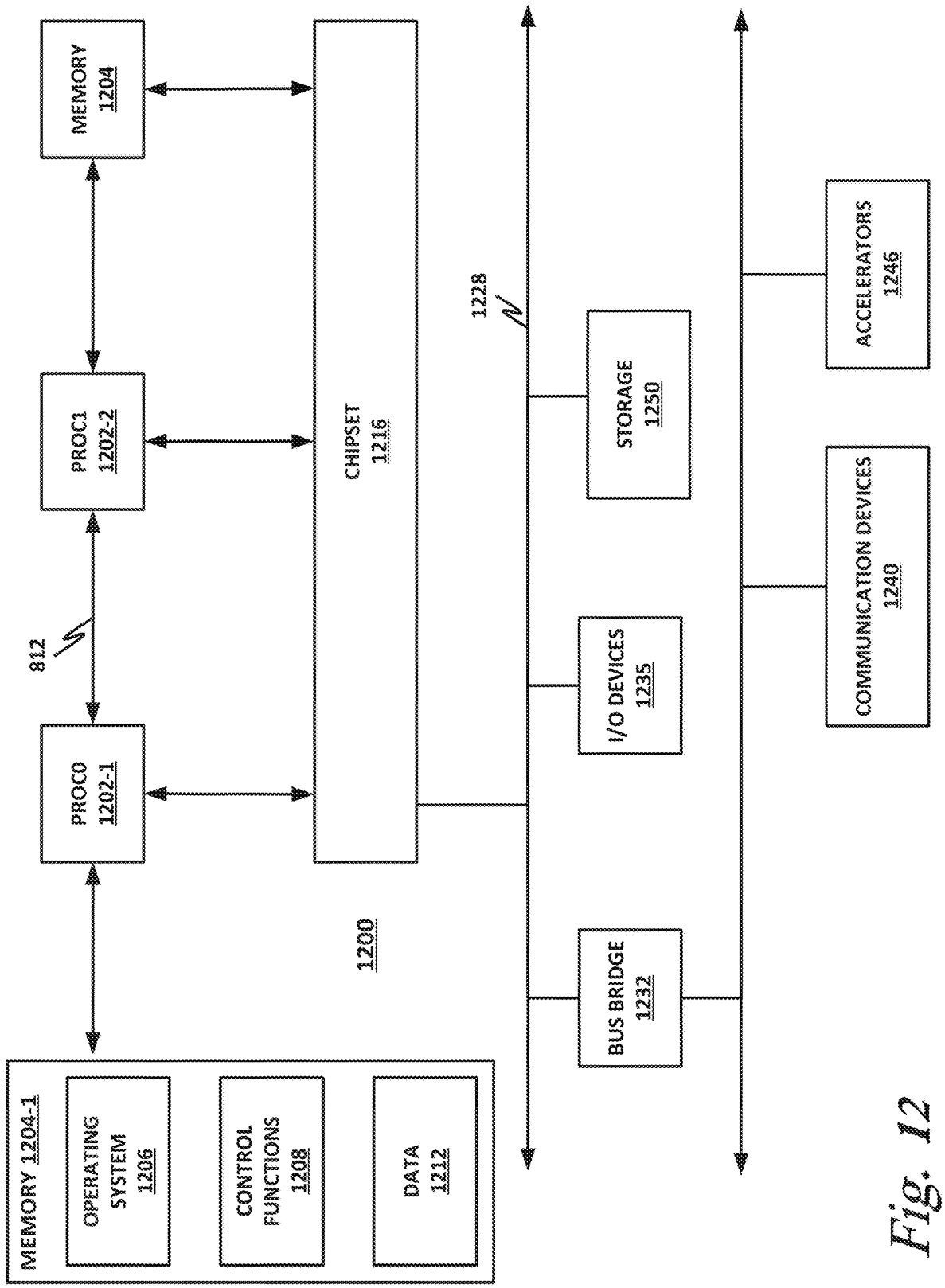
FIG. 12 is a block diagram of a hardware platform.

AV controller 200 may be based on a hardware platform. The hardware platform may include a processor, memory, and other elements to provide the hardware infrastructure for AV controller 200. Examples of additional selected elements of a hardware platform are illustrated in FIG. 12 below.

AV controller 200 may include several peripheral devices that assist the AV controller in performing its function. These may include, by way of illustrative and non-limiting example, speakers 230, microphones 232, internal cameras 236. External cameras 240, touchscreen 246, digital data transceiver 248, subscriber identity module (SIM) card 252, and cellular transceiver 244.

Speakers 230 may be located internally and/or externally to the cabin of the vehicle and may be used to provide audible feedback to an occupant of the cabin of the cabin, or to people outside the vehicle. Microphones 232 may also be disposed within or without the vehicle and may be used to pick up audible cues from the environment. For example, microphones 232 may be used to generate audio signals, from which speech can be detected. Microphones 232 may be used to monitor the environment, or to hear sounds such as sirens, horns, disturbances, or similar.

Internal cameras 236 may be used to monitor the interior of the vehicle, such as to monitor activity of occupants of the cabin of the vehicle. External cameras 240 may be used to monitor the external environment. External cameras 240 may be an integral part of the autonomous operation, which may rely in part on computer vision to identify visual elements of the external environment. Computer vision may enable the AV controller software to provide autonomous or semi-autonomous control of the vehicle. In embodiments, a camera may be used to identify contextual information, such as whether someone outside the car is attempting to block the car (such as in the context of a protest or threat).

Touchscreen 246 may provide an I/O interface for an occupant or passenger of the vehicle. Touchscreen 246 may be similar to a tablet, and may be a standalone device, or may be integrated into the AV as a fixture. In the same or a different embodiment, touchscreen 246 may be provided by a mobile device, laptop computer, or other device owned and provided by the passenger. Touchscreen 246 may provide a facility for the passenger to type messages, send texts, view maps, play games, communicate with the vehicle, communicate with rider support, or perform other actions that may be useful to the passenger or occupant.

Digital data transceiver 248, SIM card 252, and cellular transceiver 244 may form a communication suite. For example, digital data transceiver 248 may provide a network interface to a digital data service, such as a long-term evolution (LTE) fourth-generation (4G) service, a fifth-generation (5G) service, or some other similar wired or wireless digital data service. Digital data transceiver 248 may communicatively couple AV controller 200 to the internet or to other network services. SIM card 252 may operate with cellular transceiver 244 to provide voice communication via cellular communication networks. Sim card 252 provides a unique identity on the cellular network and may provide, for example, a phone number or other identifier for AV controller 200. Cellular transceiver 244 may include the hardware, software, and firmware elements to provide communication with a voice-based cellular communication network.

In embodiments, cellular transceiver 244 may be either a digital or an analog cellular network connection. In the case of a digital connection, cellular transceiver 244 may digitize voice communications and optionally compress data before sending the data over the cellular network.

AV controller 200 may also include a plurality of software modules 202. Software modules 202 may run on an operating system, such as an embedded or real-time operating system provided by AV controller 200. Software modules 202 provide various functions and facilities and may interact with appropriate hardware elements in performing their functions. The division of software elements within software modules 202 is provided as a logical division and is not necessarily representative of a physical division. In some cases, various software modules may run as dedicated services or microservices on AV controller 200 and may be isolated or sandboxed from one another. In other cases, some software modules may be bundled into a single physical or logical software module. Other configurations are possible.

AV control software 208 may include the primary logic for operating the AV. In the case that AV is fully autonomous (e.g., "L4" or higher, as defined by the society of automotive engineer (SAE)), AV control software 208 may have full control of the vehicle. In that case, a passenger or occupant of the vehicle may have no access to controls such as the accelerator or steering wheel. The system may be, for example, a ride-hail vehicle service, or a privately owned vehicle that is self-driving.

AV control software 208 receives data, for example, from speakers 230, cameras 236, 240, and other sensors as illustrated in FIG. 1. AV control software 208 may use AI, such as a deep learning (DL) model 224 to make control decisions for the AV. A single DL model 224 is illustrated in this figure, but in many embodiments multiple DL models are provided, and provide different functionality. In some cases, DL models 224 may be provided to enable not only the core AV control functionality, but to provide support functions such as those provided by onboard assistant 212.

AV controller 200 may also include a user interface 210. User interface 210 may be used, for example, to drive touchscreen 246, or to provide other interactions for a user, occupant, or passenger of the vehicle.

I/O drivers 220 may provide a software stack that enables communication between software modules 202 and various hardware elements such as those illustrated for AV controller 200.

A network stack 216 may be provided to communicatively couple AV controller 200 to an external network such as the internet, an intranet, or some other data communication network. Network stack 216 may communicate via digital data transceiver 248. Network stack 216 may also provide services for cellular transceiver 244.

AV controller 200 may include an onboard assistant 212. Onboard assistant 212 provides features that are useful to the passenger of the AV. Onboard assistant 212 may monitor for conditions that may trigger a session between the AV and a service agent. Onboard assistant 212 may be a client application that communicates with an AV operator to allow the passenger to interact with the service agent. The client application may establish a connection between the AV and the service agent when a session is triggered. The client application may transmit information such as sensor data or state of the user interface 210 from the AV controller 200, to the AV operator for facilitating the interaction with the service agent.

AV controller 200 may include an emergency response module 228. Emergency response module 228 may handle a special case or subset of the functions of onboard assistant 212. Emergency response module 228 may specifically be concerned with handling emergency conditions, such as a collision, mechanical failure, or other condition that poses a danger to the occupant or to the vehicle or both. Emergency response module 228 may be a client application that communicates with an AV operator or emergency services to handle such emergency conditions.

AV controller 200 may also include a natural language processing (NLP) engine 222, which may be used to understand verbal commands, queries, and other interactions with the passenger. For example, if the passenger speaks within the cabin of the AV, then microphones 232 may pick up the voice, and NLP engine 222 may use machine learning (such as DL model 224) to transcribe the spoken word. NLP engine 222 may also use a machine learning model to attempt to understand what the passenger has said and formulate a response.

Text-to-speech engine 226 may translate the response into human perceptible speech patterns, which may be driven to speakers 230. Text-to-speech provides real-time direct interaction between the passenger and the AV.

Exemplary System Involving a Fleet of AVs

Figure 3:
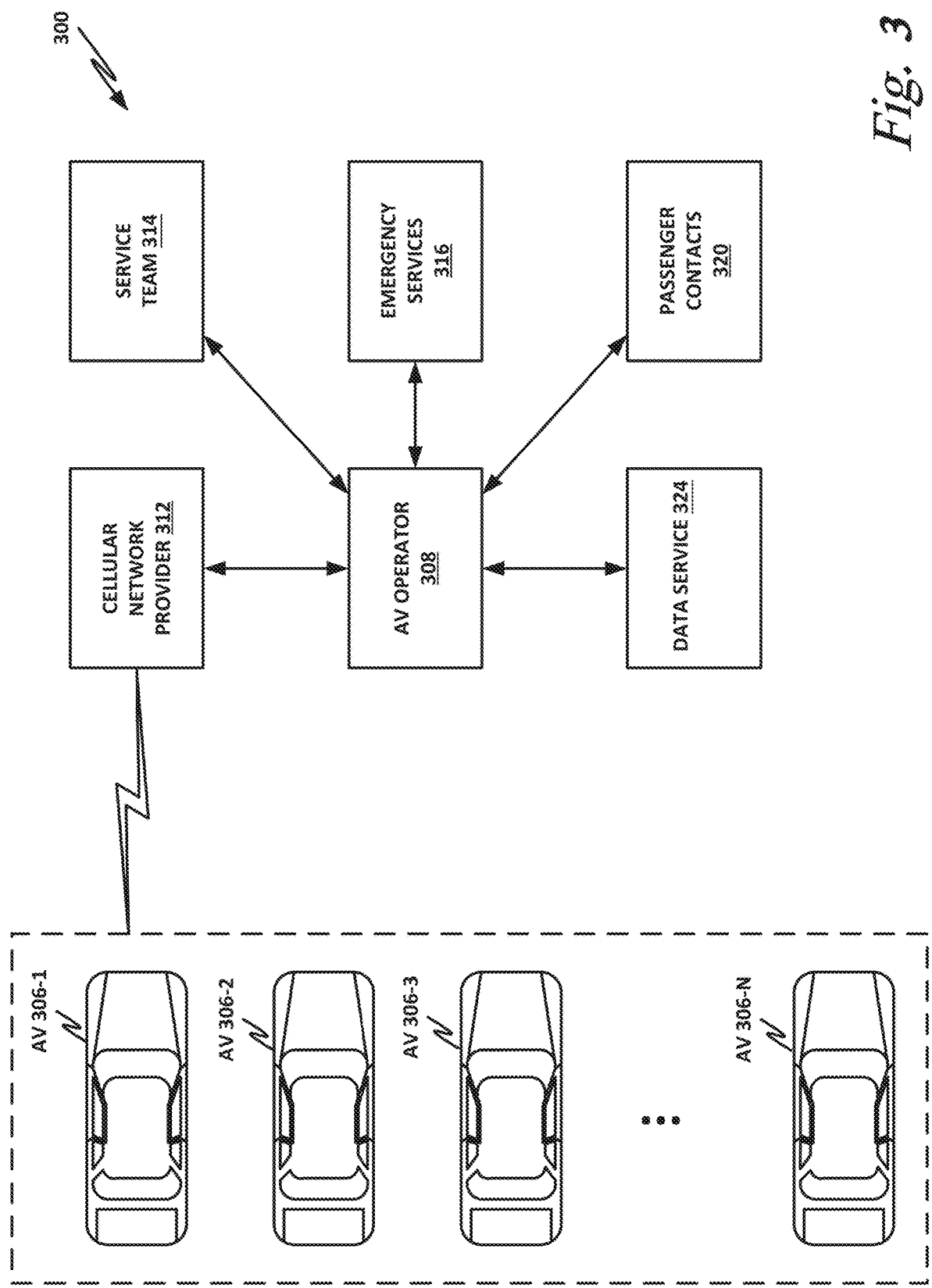
FIG. 3 is a block diagram illustration of selected elements of an AV.

FIG. 3 is a block diagram illustration of selected elements of a system 300 involving a fleet of AVs. In this illustration, AV operator 308 may operate and include a fleet of AVs 306 and the infrastructure that manages and supports the fleet of AVs. In some cases, AV operator 308 may be a back-end computing system or platform. Namely, illustrated here are AVs 306-1, 306-2, 306-3, through 306-N. AV operator 308 may include data centers, computer resources, electronic intelligence, and (optionally) human operators including human service representatives or service agents. Human service representatives may have a user interface on which they may view AVs 306 within the fleet, including their GPS location, speed, destination, number of passengers, and other information. The user interface may be, for example, a graphical user interface (GUI), web interface, command-line interface (CLI), textual user interface (TUI), virtual reality (VR) interface, augmented reality (AR) interface, or other.

In some cases, an AV 306 (or rider of AV 306) may encounter an event or special condition that triggers a response by an onboard assistant, such as onboard assistant 212 of FIG. 2. Triggering events may include emergency or non-emergency events. For example, a triggering event that activates the onboard assistant may include a passenger pressing a hardware or software button, which initiates a call with the AV operator. In another example, a user asks a simple question which does not require further intervention from a service agent. In that case, the onboard assistant may autonomously answer the question and the interaction may stay local within the AV 306.

In cases where further intervention is required, AVs 306 may place a call or establish a communication session, e.g., via cellular network provider 312, to AV operator 308. Cellular network provider 312 may then provide a voice, video, or multi-media link between the AV 306, the passenger, and AV operator 308. In some cases, the call is initially placed as a conference call with the AV operator 308 in control of the conference call. The use of a conference call may enable AV operator 308 to manage the call, to add or remove parties as necessary, and to otherwise maintain contact with AV 306 and the passenger without interruption. In some cases, establishing the call as a conference call initially means that the passenger need not be placed on hold if AV operator 308 needs to involve other parties. For example, AV operator 308 may connect to a service team 314. The team could be an internal service team, or an outside service contractor. Service team 314 may help to resolve complaints, concerns, feedback (positive or negative), questions, or other service issues.

In some cases, a data service 324 may provide information to AV operator 308 and/or service team 314. For example, the passenger may book a ride with a ride-hail vehicle via a ride-hail application. The application may include a user account, wherein the rider opts to provide to provide and share certain information with AV operator 308. Information could include personally identifying information (PII) about the passenger, a phonebook of contacts, an emergency contact, user preferences, common routes and destinations, or similar. AV operator 308 may share information from data service 324 according to the terms of a license agreement, and according to a present need. For example, if service team 314 needs information from data service 324, then AV operator 308 may provide the information to service team 314.

In the case of an emergency, it may be desirable to provide other connections. For example, AV operator 308 may communicate with emergency services 316 to dispatch emergency crews to a current location of AV 306 to assess the situation and to provide aid to the passenger as necessary. AV operator 308 may cooperate with emergency response module 228 of FIG. 2 to provide information to emergency services 316 to facilitate dispatch of emergency crews or other emergency services. In some cases, data service 324 may include a list of known passenger contacts 320, or the passenger may use a mobile device such as a cell phone to share emergency contact with the onboard assistant. In the case of an emergency, AV operator 308 may contact an emergency contact on behalf of the passenger.

In other examples, the passenger may simply wish to place a call to one of his or her contacts, in which case AV operator 308 may connect the call and then, if appropriate, remove itself from the call so that there is a direct communication between the passenger and the passenger contact. In the same or a different embodiment, the onboard assistant may connect the passenger directly to a contact, without including AV operator 308.

As described above, the onboard assistant need not provide strictly emergency services. For example, data service 324 could also include a provider of games, movies, music, or other entertainment. AV operator 308 may stream entertainment content to an AV 306 via cellular network provider 312 or some other communication network.

In the same or a different embodiment, data service 324 may also provide useful information such as weather reports, traffic reports, breaking news, incident reports, or other. For example, the onboard assistant may use information from data service 324 to determine that adverse weather has made the planned route less desirable. As an illustration, the data service 324 may report a flash flood watch or flash flood warning, and the onboard assistant may determine that the planned route includes low water crossings. In that case, the onboard assistant may reroute to provide a better trip experience. The data service 324 may also provide information that could similarly be used to reroute to avoid construction, traffic, congestion, adverse conditions (e.g., civil unrest, a structural fire, a dangerous gas leak, etc.), or other conditions that affect the safety and/or desirability of the planned route.

AV operator 308 may also provide advice to the passenger in the event of other non-emergency situations that may nevertheless be stressful or uncomfortable. For example, if a police officer pulls over the ride-hail vehicle, AV operator 308 may establish a call with an AV 306 via the onboard assistant, and help the passenger to remain calm, answer questions for the passenger, or assist the passenger in interacting with the law enforcement official.

Other illustrative functions of an onboard assistant may be seen throughout this specification.

Exemplary Method of Providing Onboard Assistance to a Passenger of an AV

Figure 4:
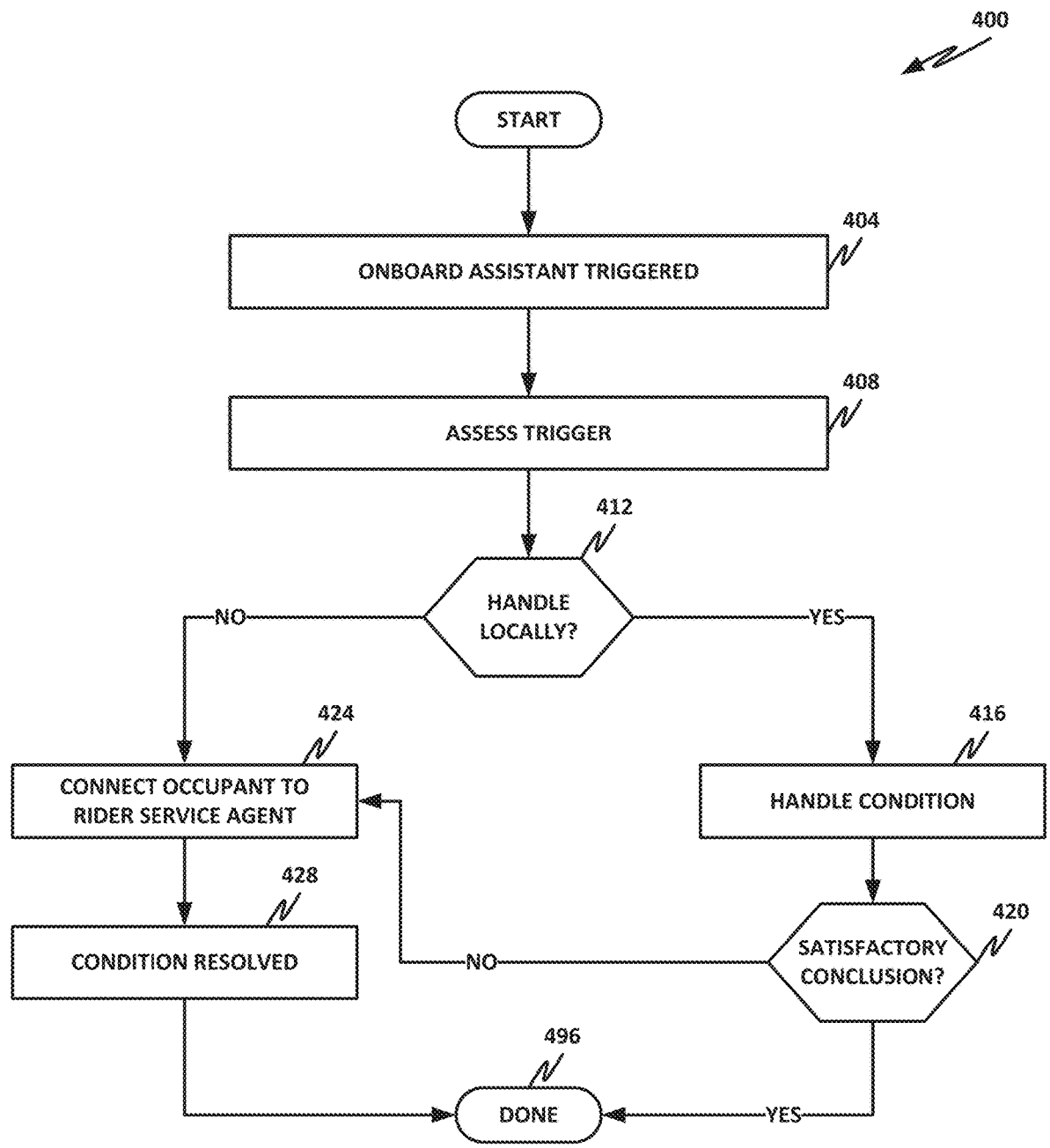
FIG. 4 is a flowchart of a selected elements of a method of providing onboard assistance to a passenger of an AV.

FIG. 4 is a flowchart of method 400 of providing onboard assistance to a passenger of an AV.

In block 404, an appropriate event, often referred to herein as a service incident or a service instance, triggers the onboard assistant (e.g., onboard assistant 212 of FIG. 2). As discussed above, this could be an emergency or non-emergency event. For example, the event may include a button push by the passenger, an accident, a law enforcement interaction, hazardous weather, civil unrest, a hazard, a service complaint, problematic behavior by the passenger, or other event.

In block 408, the onboard assistant may assess the trigger to determine the appropriate response. In particular, the onboard assistant may determine whether the incident is to be handled locally (e.g., by the AV controller 200 and/or onboard assistant 212 of FIG. 2) or remotely (e.g., by the AV operator 308 and/or service team 314 of FIG. 3). In some cases, although not illustrated in FIG. 4, an incident can be handled locally and remotely in combination.

In decision block 412, the onboard assistant decides whether to handle the interaction locally, according to the assessment of block 408. If the interaction is to be handled locally, then in block 416, the AV controller handles the interaction, which may include, for example, handling a user request to stream entertainment services, answering questions from the user, determining that the user has asked to be let out of the AV early, or performing some other function that the AV controller may handle on its own without outside intervention.

In decision block 420, the AV controller determines whether there was a satisfactory conclusion to the onboard assistance trigger, or whether additional action is necessary. If the interaction was successfully handled, then in block 496 the method is done.

Returning to decision block 420, if there was not a satisfactory conclusion, and if it is necessary to involve an outside agent, then control may pass to block 424.

Returning to decision block 412, if the interaction cannot be handled locally, then control passes to block 424. Within block 424, either because the AV controller initially decided not to handle the interaction locally, or because the AV controller was unable to satisfactorily conclude the interaction, the AV controller may communicatively couple to the AV operator, for example, to rider service or rider service. Connecting to rider service may enable the occupant to talk with a human rider support agent, or to interact with a device that has more capability than the onboard AV controller. Such a device may include a service agent, or some other agent of the AV operator. In some cases, this may also include connecting to emergency services or other third parties, to ensure that the user receives timely assistance in the event of an emergency or non-emergency incident.

In block 428, the incident is resolved with the intervention of appropriate human or other actors.

In block 496, the method is done.

Exemplary Method for Detecting and Resolving an Alert Condition

Figure 5:
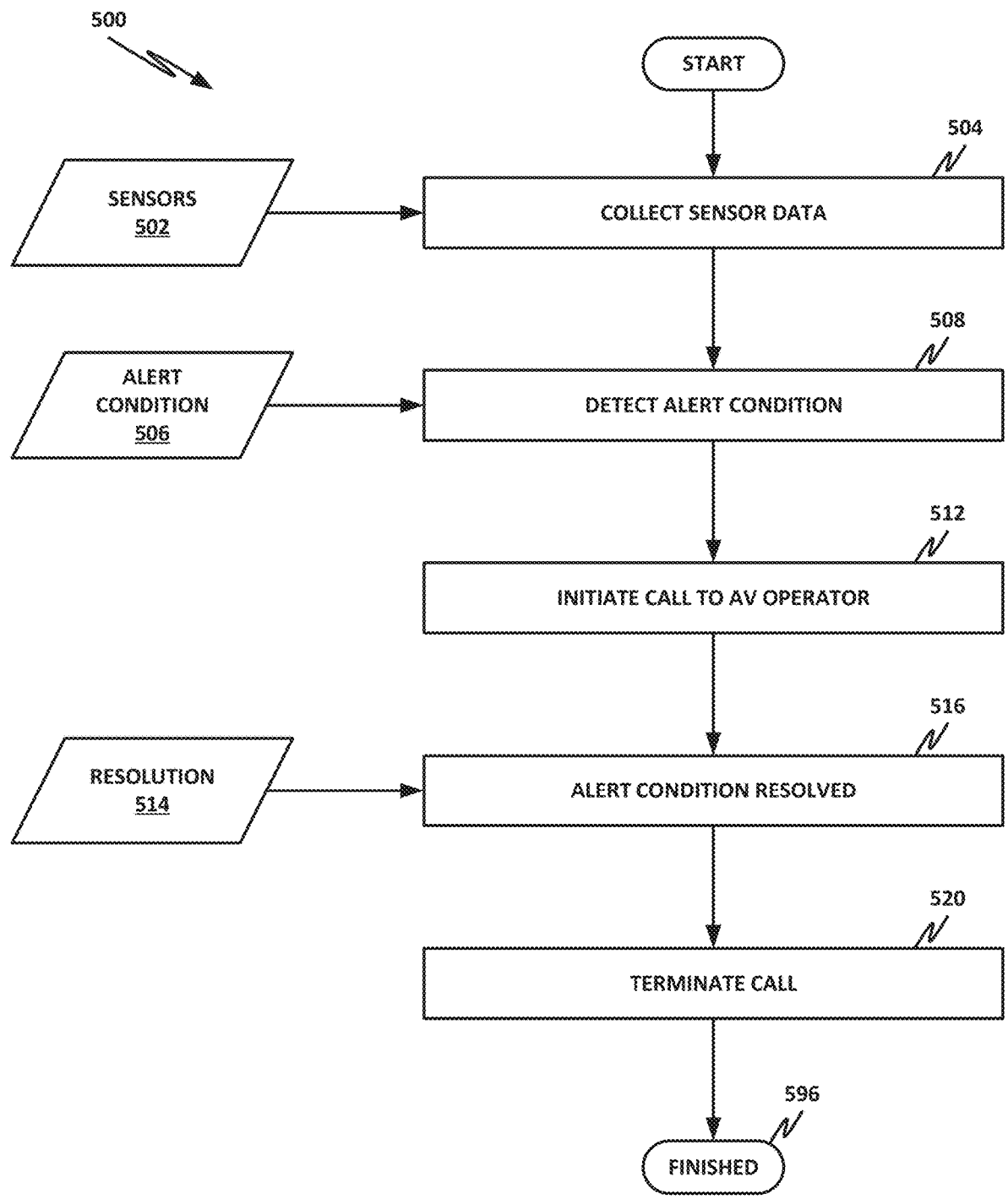
FIG. 5 is a flowchart of selected elements of a method of resolving a rider service incident.

FIG. 5 is a flowchart of a method 500. Method 500 illustrates selected elements of responding to an alert condition for an onboard assistant. As described more extensively below, the alert condition may be an emergency or non-emergency alert condition.

In block 504, the AV controller collects sensor data from sensors 502. The sensor data may include environmental sensors (e.g., that may detect a collision), NLP processing (to detect a spoken request), processing of inputs via a user interface, such as a tablet or other touchscreen, processing of text input that may be typed, or other sensor data.

In block 508, the onboard assistant detects alert condition 506. Alert condition 506 tells the onboard assistant that some action needs to be taken. The alert condition may be, for example, an express interaction from the user, such as pushing an "assist" button (hardware or software button), verbally requesting assistance, or taking some other explicit action. The alert condition may also be (automatically) inferred from onboard sensors, such as audio, video, vibration, compass, GPS, accelerometers, or other sensors. Alert conditions may also be inferred from third-party data sources, such as weather and/or news services, or others. An inferred alert condition may be a danger to the vehicle and/or the passenger, a collision, an unexpected vehicle occupant, a route diversion, a violation of rules or agreements, or similar.

In some cases, the alert condition may benefit from intervention from the AV operator. Thus, in block 512, the AV operator may initiate a call or the onboard assistant may cause a call or session to be initiated. The call may be an audio call. The call may be a video call. The call may be a forced call, meaning it is a call that the passenger cannot terminate the call or hang up at will. The call may be recorded. In some cases, a pre-recorded audio message and/or chime for the passenger is played when the call is being initiated or at a beginning of a call. The audio message may include an alert sound or message to inform the passenger that the call is being recorded. While the call is initiated or in session, non-essential applications provided in the AV may be terminated or paused for the duration of the call.

Alternatively, the alert condition may be one that the AV can autonomously resolve locally (e.g., a minor issue, a request for information, or similar), meaning a call is not initiated in 512 (or 512 is skipped).

In some cases, the passenger or the AV operator can initiate a rider service session within a certain period of time before the moment the rider enters the AV. In some cases, the passenger or the AV operator can initiate a rider service session within a certain period of time after the rider exists the AV. Accordingly, rider service can be provided before and/or after a ride to ensure optimal rider experience.

Once a resolution 514 is reached, then in block 516, the alert condition is resolved.

Generally speaking, 508, 512, and 516 of method 500 may be performed in a variety of ways. The following illustrates several examples for detecting/inferring an alert condition, initiating a call/session, and resolving the alert condition.

The following represents a non-exhaustive list of alert conditions:
- Detected a help request from a passenger to initiate a call or session,
- Detected a rider service request from a passenger to initiate a call or a session,
- Detected a question or query from a passenger,
- Detected that a ride in the AV is being ended earlier than planned, or that the rider has requested to end a ride in the AV earlier than planned,
- Detected a collision,
- Detected a medical concern for the passenger/rider,
- Detected a safety concern,
- Detected a wellbeing concern,
- Detected a law enforcement interaction (e.g., camera and sound sensors onboard the vehicle),
- Detected adverse weather condition,
- Detected tampering or tampering attempt,
- Detected a door or window left open (e.g., in adverse weather conditions or after a rider exits an AV),
- Detected an unsecure cabin state,
- Detected a violation of or failure of the rider to comply with AV operator policy,
- Detected a violation of or failure of the rider to comply with laws/regulations,
- Detected illegal activity in the AV,
- Detected presence of an illegal or prohibited weapon,
- Detected a violation of or failure of the rider to comply with health policy or regulation,
- Detected the passenger eating or drinking a prohibited food or drink item in the AV,
- Detected the passenger is using, consuming, injecting, or smoking a prohibited substance in the AV,
- Detected an altercation between two or more occupants of the AV or persons near the AV,
- Detected an uncomfortable maneuver has been made by the AV (e.g., abruptly pulling over), or an unusual maneuver has been made by the AV (e.g., pulling over when there are no vehicles on the road).
- Detected an item left behind by the rider of the AV, and
- Detected an unexpected/unticketed/unpaid/unwanted/unauthorized/unexpected person (or animal) in the AV or approaching the AV.

The AV assistant may also detect or infer, from data from AV's onboard sensors, that a call/session is needed, according to alert conditions such as a disturbance, collision, adverse weather event, adverse road conditions, adverse social event, law enforcement interaction, or other. The data from AV's onboard sensors or other data sources can suggest that an alert condition having one or more characteristics (or cause the alert condition to be classified as being one or more of the following classes): recoverable, non-recoverable, emergency, non-emergency, disabling, or non-disabling. Depending on the nature or characteristic(s) of the alert condition, the AV may react appropriately, the rider service agent may provide instructions for how to react accordingly, and/or prompt a specific resolution 514 to be used to resolve the alert condition in 516.

For example, in the case of a recoverable incident (one that does not terminate the trip), the AV may reroute, modify speed, or otherwise modify the trip as part of the resolution to the alert condition. In some cases, the passenger may expressly request a different route, or request that the trip end early.

In the case of an interruption (such as a law enforcement interaction), the AV may provide instructions to help the passenger navigate the situation, and then resume the trip as appropriate as part of the resolution to the alert condition. For instance, there may be a law enforcement interaction, such as a traffic officer pulling over the AV for a moving violation or other purpose. In that case, it may be desirable to place a call to help provide support for the passenger during the law enforcement interaction, such as providing advice or guidance on the law enforcement interaction. Furthermore, if the AV is fully autonomous and the passenger is not a driver, then it may be necessary for the officer who pulled over the AV to speak with a representative of the AV operator to complete the law enforcement interaction.

In some cases, the incident may be non-recoverable, and requires early termination of the ride as part of the resolution to the alert condition. For example, a collision, severe weather or road conditions, severe social disturbance, severe adverse law enforcement interactions, or other circumstances may make it impossible or impractical to finish the trip. In those cases, the rider service agent may assist the passenger in getting any help needed, and take appropriate action to ensure that the passenger remains safe and comfortable. The rider service agent may also dispatch appropriate services, such as roadside assistance, towing, emergency responders, or others.

Both recoverable and non-recoverable events may, in appropriate circumstances, be classified as non-disabling events. A non-disabling event may include any event that requires some level of rider service interaction or intervention (including an event that can be handled locally by the onboard assistant), but that does not disable the vehicle (such as a collision). Some non-disabling events may be recoverable, and others may be non-recoverable.

For example, a passenger medical emergency as an alert condition may be non-recoverable, but non-disabling. In the case of a medical emergency, it may be impractical to complete the trip, as the passenger's health and safety may take precedence over the planned trip. In that case, the trip may be modified as part of the resolution to the alert condition, for example, to deliver the passenger to the nearest available medical facility, or to some other helpful location. In some cases, resolving the alert condition involves notifying an emergency medical service specific for addressing the detected medical emergency.

A simple query from the rider (e.g., a question or request) can be both recoverable and non-disabling. A law enforcement interaction may delay the ride, but is non-disabling (assuming the passenger and/or the vehicle are not detained) and recoverable. A severe weather event, social unrest, threat to safety, or other disruption may be non-disabling (i.e., the vehicle is still operable), but may also be non-recoverable if the route to the destination is blocked, and there are no practical alternative routes available.

Other non-recoverable events may include events in which the passenger refuses to comply with rules, is unsafe, threatens to damage the vehicle, refuses to leave the vehicle, or an unauthorized other passenger refuses to leave the vehicle. In such case, the purpose of the trip may be modified as part of the resolution to the alert condition. For example, if the route has become unsafe, the purpose may be to deliver the passenger to a best available safe alternative location, which may include querying the passenger for a preferred alternative location. In the case of non-compliance or a threat, the passenger may be refused service, or delivered to a nearest available alternative location. In severe cases (e.g., in a case where the passenger is committing criminal acts, or is identified as a wanted criminal), the purpose may be to assist law enforcement personnel, to the extent practical, in identifying and/or apprehending the passenger.

In some embodiments, if a special alert condition is encountered, then the AV controller may provide shared metadata about the alert condition to the AV operator or to a third-party as part of the resolution to the alert condition. In some cases, the AV operator may act as a broker to provide appropriate information to third parties as appropriate or necessary.

In some embodiments, the AV controller may communicate with a user data service, such as a cloud-based data store, that includes information about the passenger which the passenger may have voluntarily shared with the AV operator or that the passenger authorized the AV operator to access. In some cases, the resolution 514 may be adapted according to the information about the passenger.

In some embodiments, the system may provide to the AV operator metadata or other information about a cause of the alert condition. In some embodiments, in some cases, the cause may include illegal or criminal activity. In that case, the AV operator may forward the metadata about the alert condition to an appropriate law enforcement agency. In some embodiments, the cause of the alert condition may also include a failure of the passenger to comply with a law or regulation. In that case, the AV operator may take appropriate responsive action as part of the resolution to the alert condition.

In some embodiments, the cause or alert condition may also include failure of the passenger to comply with a policy of the operator of the AV. Such failure may not be a legal compliance issue but may be a policy issue for the AV operator. For example, the AV operator may have policies that protect its AV fleet from damage, misuse, compromise, or other adverse conditions. If a passenger breaches these policies, then the AV operator may wish to take appropriate corrective or responsive action as part of the resolution to the alert condition. In some embodiments, the alert condition may also comprise detection of an illegal or prohibited weapon in the cab of the AV. For example, if the passenger is carrying a firearm that is prohibited within the AV (either by law of the appropriate jurisdiction or by policy of the AV operator), then an alert condition may be triggered and the AV operator may take appropriate corrective or responsive action. In some embodiments, the alert condition may also comprise failure of the passenger to comply with a health policy or regulation. For example, if the passenger is within a jurisdiction that includes a mask mandate during a time of pandemic or other health policy or regulation, and the passenger fails to comply, then the AV operator may be notified and appropriate corrective or responsive action may be taken. In some embodiments, the alert condition could also include the passenger eating or drinking a prohibited food item within the cab of the AV. Eating or drinking may include a food or drink item that is prohibited for purposes of keeping the AV cab clean and undamaged. In some embodiments, the alert condition could also comprise detecting that the passenger is using, consuming, injecting, smoking, or otherwise taking part in an illegal or prohibited substance in the AV, such as narcotic drugs, cigarettes, marijuana, or similar.

In some embodiments, the alert condition could be a non-emergency alert condition, and the AV controller may notify the second party of the call to the non-emergency alert condition as part of the resolution to the alert condition. In some embodiments, the non-emergency alert condition could comprise determining that an unauthorized, unticketed/unpaid, unidentified, or unwanted passenger has entered the AV. In some embodiments, in the case of a non-emergency condition, the call may be to a rider service agent for the AV operator or to some other third-party. For example, in the case of an unticketed/unpaid passenger, the call may be placed to a rider service agent who may inquire if the ticketed passenger wishes to add the unticketed/unpaid passenger to the trip.

In some embodiments, using sensors, the system could also detect a medical emergency for the passenger as the alert condition and notify an emergency medical service of the medical emergency as part of the resolution to the alert condition. For example, this could include detecting that the passenger is or may be suffering a heart attack, is having trouble breathing, has collapsed, has passed out, or otherwise has encountered an emergency medical condition.

In some embodiments, the alert condition could also be a safety concern. For example, if the passenger refuses to wear a seatbelt, removes a seatbelt while the vehicle is in operation, or otherwise is behaving in an unsafe manner, then the AV may attempt to enter a safe state and may place a call to a rider service agent to help resolve the condition.

In some cases, the alert condition relates to a concern for the safety or wellbeing of the rider not being suitable to be dropped off (e.g., rider is intoxicated but does not present a medical emergency, rider is violent, rider is afraid, rider may present a danger to the rider itself or people in the environment of the AV), or it is detected that the rider is may be more suited to be inside the AV (e.g., enroute to the destination) as opposed to being dropped off. In such cases, the resolution of the alert condition may include one or more of the following examples: maintaining the rider in the AV, ensuring the rider arrives at the designated location or a designated safe location, monitoring the rider's health and emotional response during the ride with AV sensors, keeping the rider in the AV until it is determined that the rider is suitable to exit the AV.

In some embodiments, in the case of an alert condition that requires interaction with or intervention from the AV operator, the AV operator may open a session with the AV, and in response to a notification, the AV controller may provide access, to the AV operator, information from the electronic sensor suite as part of the resolution to the alert condition. In some embodiments, the data from the electronic sensor suite may comprise location data for the AV. In some embodiments, data from the electronic sensor suite may also comprise a live video stream from an internal or external camera of the AV. In some embodiments, data from the electronic sensor suite may include route data for the AV. In some embodiments, data from the electronic sensor suite may comprise state data for the AV. In some embodiments, data from the electronic sensor suite may comprise cabin control state data for the AV. For example, this may include the status of temperature controls within the cabin, radio controls, a tablet or other interface provided for the passenger, or in the case of a semi-autonomous AV, the state of steering, throttle, and other inputs. In some embodiments, data from the electronic sensor suite could include trip information for the AV. In some embodiments, data from the electronic sensor suite may include seat weight data from a weight sensor within the cabin seats.

In some cases, the call/session initiated can be broadcast via external speakers of the AV. For instance, if an item is left behind in an AV (i.e., the alert condition), the call/session being broadcast via internal or external speakers of the AV can resolve the alert condition by notifying the rider of the item left behind, e.g., as the rider exits or walks away from the AV. In some cases, alternatively or in addition to broadcasting the call or session, a notification of the item left behind can be pushed or provided by the AV controller, the AV operator, or a suitable cloud service, to the rider via a mobile application to resolve the alert condition. In some cases, the resolution of the alert condition includes determining that the passenger has not retrieved the item left behind and opening a rider service case/ticket, including information to track the item left behind (e.g., where the AV is heading or will drop off the item). The AV can in some cases proceed to an appropriate facility or location where the item may be retrieved by the rider at a later time. The item may be stored and tracked until the rider retrieves the item.

Once the alert condition is resolved in 516, in block 520 the AV operator may terminate the call, including dropping all parties. Notably, the call may be a conference call initiated initially between the AV and the AV operator. The occupant/rider of the AV may be a party to this call via the speakers and microphones within the AV. Because the call is initiated as a conference call, the AV operator may add other parties to the call as necessary. Parties may include, for example, emergency contacts, rider service agents, emergency personnel, legal counsel, or other parties that may be beneficial in resolving the alert condition. Thus, when the AV operator terminates the call, it may terminate the call for all parties on the conference call.

In some cases, in 520, the alert condition is detected to be resolved, and in response, the call or session is automatically terminated after the alert condition is resolved or terminated.

In some cases, the passenger may wish to resume a previous rider service call that was terminated. In that case, the passenger may press an assist button, which may be a hardware button within the car, a software button on a tablet or other interface, or a software button on a ride-hail application on the rider's mobile device. If the user presses this button, or verbally requests assistance, within a time threshold (e.g., 5 minutes) from the termination of the previous call, then the previous call is resumed. Resuming a previous call may include placing the passenger in contact with the same rider service agent who was previously working the call and/or operating on the same rider service ticket or incident number.

In block 596, the method is done.

Advantages of Using Conference Call for a Service Session

Figure 6:
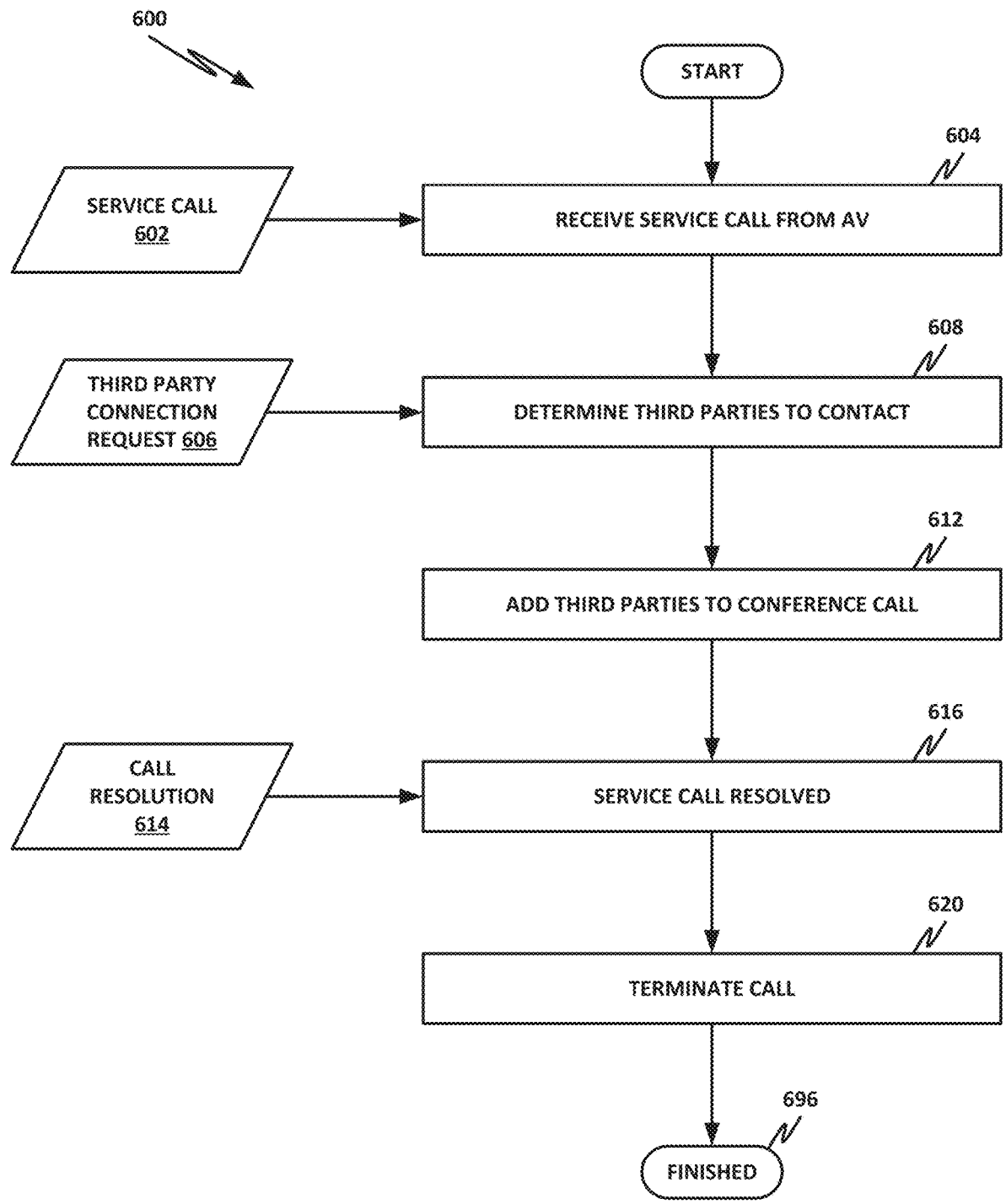
FIG. 6 is a flowchart of selected elements of a method of providing a conference call.

FIG. 6 is a flowchart of a method 600. Method 600 may be performed, for example, by the AV operator in response to a service incident with a rider. In particular, the method 600 highlights reasons a conference call is beneficial for resolving service incidents, and benefits to the AV operator managing the conference call.

To resolve a detected alert condition, the onboard assistant may cause a call to be placed between a rider/or AV and a rider service center, which may be initiated by the AV operator in some cases, as a conference call. The AV operator being the manager and initiator of the conference call can offer benefits of greater control and intelligence for how the alert condition should be resolved, and what data should be exchanged for a given situation. Some benefits are mentioned below.

One, the AV operator is in control of who the parties are for the conference call, and rider intervention or initiation is not required. Moreover, the rider does not need to wait to be connected. The conference call can place the passenger in contact with a rider service agent, as well as other services, such as first responders, emergency services, technical support, or others depending on the nature of the alert condition.

Two, the AV operator has control over who should be added to or removed from the conference call, and is not limited by the number participants to a call (e.g., from no participants, to 10 participants if needed or desired). Three, the AV operator can control when the call should be terminated. Four, the AV operator manages and has access to the data associated with riders and AVs (including privacy preferences or user settings/contacts of the riders), and can judiciously select what data to share with a given party to the conference call accordingly.

In some embodiments, it may be desirable for the AV operator to manage the call to be able to expedite adding or removing parties to or from the call as desired, appropriate, or necessary. For example, it may be desirable to add emergency services, rider service operators, or other parties to the call as necessary. If the AV operator maintains control of the call and operates the call as a multiparty conference call, then parties may be added as necessary with minimal delay or removed with minimal delay. Thus, in at least some embodiments, initiating the call may include initiating the call as a conference call with two or more parties.

In some embodiments, the call may initially be between the passenger as a first party and an operator of the AV as the other party. For example, the other party may include a rider service representative or some other human agent of the AV operator.

In some embodiments, the AV operator may maintain control of the call throughout the duration of the call. In some embodiments, the AV operator or another participant in the call may add a new party to the conference call to provide further services. In some embodiments, the new party may be a rider service representative. In some embodiments, the new party may also be a law enforcement organization. For example, the AV operator may detect an alert condition that includes a crime in progress or other condition that requires intervention by law enforcement. Thus, the AV operator may connect the passenger to law enforcement to receive assistance. This connection may be similar to placing a 911 call on behalf of the passenger.

In some embodiments, in some cases, the system disclosed may include software that allows a human agent of the AV operator to (dynamically) add or remove parties from the conference call using a visual interface, such as a graphical user interface.

In some embodiments, for purposes of safety and/or legal compliance, it may be desirable to provide the operator of the AV with the ability to access an audio/video stream from an interior or exterior camera of the AV, e.g., a human agent of the AV operator as part of the conference call can view the audio/video stream.

In some embodiments, the AV operator may obtain contextual information of the rider and/or the AV (e.g., including a cause that triggered the session, and historical information of the rider, AV, rider service sessions associated with the rider, rider service sessions associated with the AV) and cause the contextual information to be transmitted to one or more parties on the conference call. The contextual information can be displayed, via a graphical user interface, to the one or more parties of the conference call to facilitate or adapt the resolution to the incident.

In some embodiments, it may be beneficial for the AV operator to maintain control of the call so as to control distribution of data or metadata about the alert condition, the rider, and/or the AV. For example, depending on the context, it may be desirable to provide emergency services information about the alert condition, such as a location of the AV, a speed of the AV, sensor data, information about the passenger, information about medical alerts for the passenger (e.g., drug interactions, drug allergies, pre-existing conditions, or other information that may be helpful to an emergency responder in treating the passenger, if necessary), or similar.

Furthermore, if the passenger is determined to be a threat or is found to be a wanted fugitive, the AV controller or AV operator may provide information about the passenger to law enforcement to assist in law enforcement operations while the AV operator is in control of the call.

In some embodiments, it may be desirable to contact a third-party on behalf of the passenger (e.g., a third-party designated for a specific alert condition in the rider's user profile with the AV operator) and add that third-party to the conference call. For example, the third-party may receive a notification of the alert condition and appropriate metadata about the alert condition as a participant to the conference call. Examples of such third-party include: emergency service, roadside assistance service, emergency contact for the rider, healthcare provider, family member, legal guardian, etc. In some cases, the rider can specify the type of information (or a level of privacy for the information) that the rider wishes to share with the third-party if the third-party is added to the conference call.

In some cases, the passenger may provide to the AV operator (e.g., via a preferences section of a web interface associated with a mobile app) the names and contact information of third parties who may be contacted and information that may be disclosed to those third parties. In some embodiments, the third-party may be an emergency contact of the passenger. In some embodiments, the contact may be a spouse or family member of the passenger. In some embodiments, the third-party could also include a roadside assistance service. In that case, it may not be desirable to disclose personal information about the passenger (e.g., if the user profile information specifies that the rider does not wish to disclose personal information about the rider), but it may be desirable to disclose information about the vehicle, its location, the alert condition, and other information that may be helpful for the roadside assistance service.

In some cases, the AV operator has standard operating procedures that determine the type of data to be shared with a specific third-party for a given type of alert condition.

Initiating a conference call can be done in different ways. The following illustrates some examples for how the conference call can be initiated and ultimately controlled by the AV operator.

In block 604, the AV operator receives service call 602 (or detects an alert condition) from a selected AV. The service call may be initiated by the AV or may be initiated by the AV operator, e.g., in cases where the AV operator needs to contact the AV or the occupant of the AV.

In block 608, the AV operator may receive an explicit or implicit third-party connection request 606. An explicit third-party connection request could be, for example, a passenger expressly asking for an ambulance, for police assistance, for firefighters, for rider service assistance, or some other service. It could also include the occupant requesting a call to an emergency contact or other contact. In block 608, the AV operator determines which third-party or parties to contact.

In block 612, the AV operator adds the third parties to the conference call. Advantageously, because the call may be initiated as a conference call, other parties may be added without placing the passenger on hold, which may be especially beneficial in emergency situations where a human occupant may be prone to panic, may be nervous, may be experiencing fear or anxiety, or may otherwise be in a condition where it would be stressful for the occupant to be placed on hold and not know what's going on. By opening the call as a conference call, the user may remain in contact with the AV operator and/or rider service agent and may have visibility into what's going on as additional parties are contacted.

In block 616, if a call resolution 614 (or resolution to an alert condition) is reached, then the service call may be resolved. For example, if the AV operator determines that the occupant has been safely removed from a dangerous situation, been given medical treatment, reached a destination, had a question answered, completed a law enforcement interaction, or similar, then the service call may be deemed resolved.

In block 620, once the service call is resolved, the AV operator may terminate the call.

In block 696, the method is done.

Leveraging Natural Language Processing to Detect and Resolve Alert Conditions

In some embodiments, the AV controller may include an NLP software engine, and the second party to the call may be the NLP software service running on the AV controller. In this case, the call is between the passenger and the AV controller. The NLP software service may be programmed to respond to interactions between the passenger and the AV. In some embodiments, the NLP engine could be programmed to respond to an interaction, such as answering questions about the trip posed by the passenger. In some embodiments, the NLP engine could also answer questions about how far the AV has traveled on the trip. In some embodiments, the NLP engine could be programmed to respond to questions about the estimated time of arrival. In some embodiments, the AV controller could be programmed to respond to questions about current traffic conditions. In some embodiments, the NLP engine may be programmed to respond to questions about weather conditions or weather forecast. In some embodiments, the NLP engine may be programmed to answer questions about the technology that the AV uses and to address common concerns of passengers who are new to AV technology. In some embodiments, the NLP engine may be programmed to play an interactive game with the passenger. For example, the NLP engine could play "20 Questions" with the passenger either as the party asking the questions or the party answering the questions.

In some embodiments, the NLP engine could respond to voice commands, such as to answer questions, search the web, place a call to a contact in the user's address book, or similar. In the case of an address book or other case where the AV controller needs access to information about the user, the user may voluntarily share the information via a cloud service associated with the ride-share or AV mobile application. In some embodiments, the AV controller may access information about the passenger from the cloud-based data store. In some embodiments, the AV controller may also respond to interactions that include allowing the user to connect a short-range radio service of the passenger's mobile device to the AV. For example, this could allow the passenger to play his or her own music over AV speakers during the trip.

In some embodiments, the NLP engine could respond to a wake word that triggers the NLP software service. For example, if the digital assistant is known as "Angel", the passenger may say "hello, Angel" to get the AV controller's attention. In some embodiments, the passenger may interact with the NLP engine via voice. In some embodiments, the passenger may interact with the AV controller via an onboard tablet or mobile device of the AV. In some embodiments, the passenger may interact with the AV via a mobile application installed on the passenger's phone.

In some embodiments, the AV controller may determine using the NLP engine that the voice commands or utterances represent an alert condition and initiate a service session, for example, with the rider service operator or an emergency service.

Figure 7:
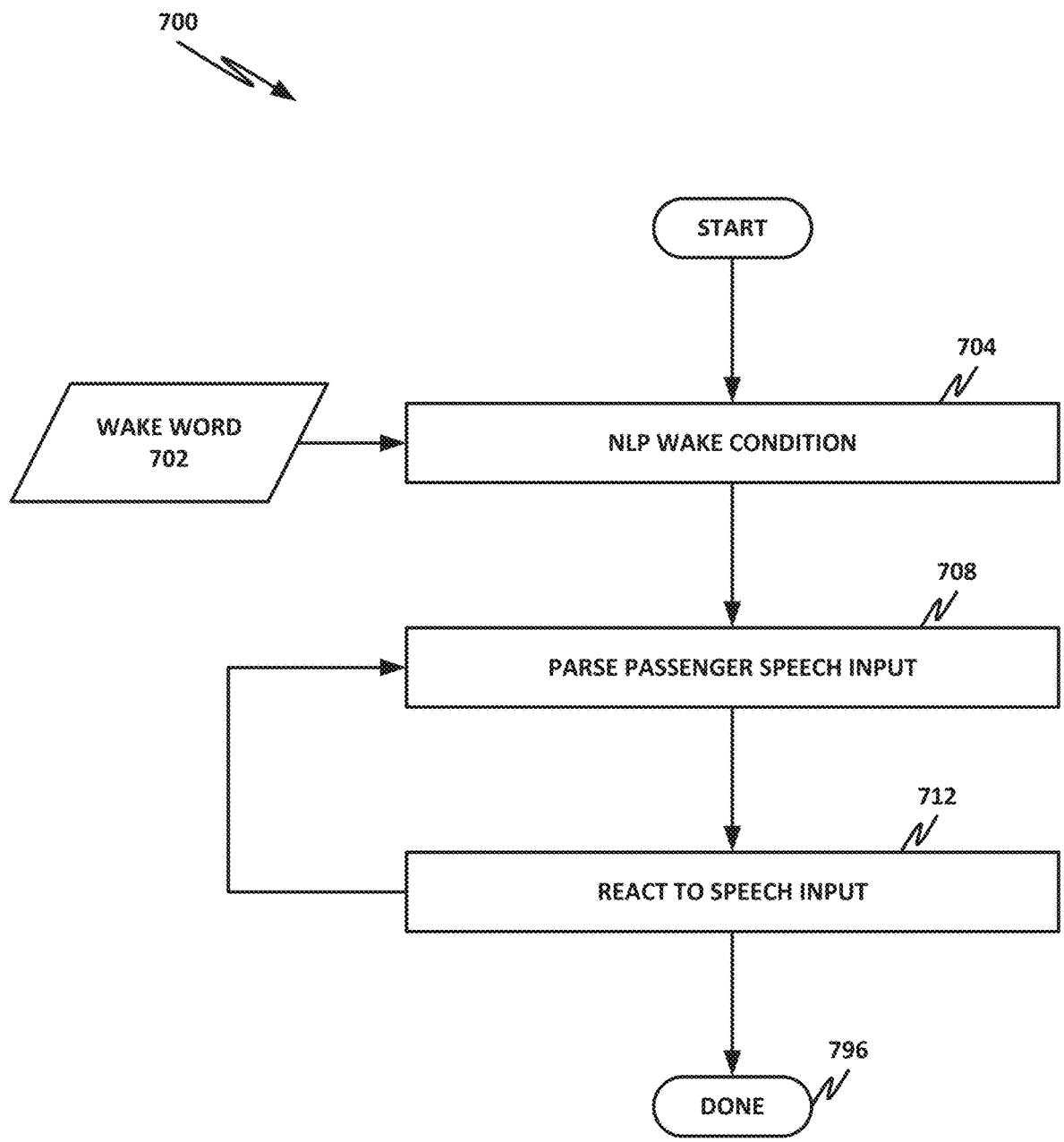
FIG. 7 is a flowchart of selected elements of a method of interacting with a passenger.

FIG. 7 is a flowchart of a method 700. Method 700 may represent a special case of a service call in which the service call is to be handled locally (first), or an alert condition is detected using NLP. The interactions illustrated in FIG. 7 are predominantly voice-based. In some cases, the interaction is via the infotainment system in the AV, including an onboard tablet or mobile device provided in the AV, a software application running on the onboard tablet or mobile device provided in the AV, and/or audio/visual system of the AV. For example, method 700 could include a case where a user is trying to interact with the AV controller via an NLP engine to ask questions, make requests, or otherwise interact or converse. Such interactions may represent a case where the AV controller is to handle the interaction locally. In this case, a session or a call may be placed internally within the AV with the occupant of the AV as a first party and the AV controller as a second party. Thus, in this context, there may not be a second human as a party to the call, at least not initially. In some cases, a user interaction with the onboard assistant may result in placing an additional call to a third-party, such as to the AV operator and/or rider service, or adding said third-party to the conference call, when it is determined that the interaction or alert condition cannot be handled entirely locally.

In block 704, the onboard assistant may encounter an NLP wake condition, such as the user speaking a wake word 702. In an illustrative example, the onboard assistant is named "Angel," in which case the user may begin interaction by saying "Hello, Angel!" To assist the passenger, there may be instructions displayed within the ride-hail vehicle telling the user how to interact with the onboard assistant. For example, an illustrative instruction card could read:

"Hello! My name is Angel and I'm your onboard assistant for this ride. If you would like to talk to me, simply say 'Hey, Angel!' I will then be listening. You may ask me questions, similar to other digital assistants, ask me to place a call, request help, ask to speak to a rider service representative, stream music, stream video, or play a game with me. If I don't understand what you're asking, I'll put you in touch with an agent who may be able to help."

In block 708, after the NLP engine has been awakened, then the NLP engine may begin to parse passenger speech input, including processing future audio clips and cached or buffered audio clips.

In block 712, after parsing the passenger speech input, the NLP engine may process the speech extracted from the parsing and determine a suitable reaction or response to the extracted speech. One suitable reaction or response may include performing text-to-voice-based on a determined textual response, and using the speakers to talk to the passenger by playing the voice as a response. Responding to the extracted speech may include: answering a question about a trip of the passenger, answering a question about how far the AV has traveled on a trip of the passenger, answering a question about estimated time of arrival, answering a question about traffic conditions, answering a question about weather conditions or weather forecast, and answering questions about technology of the AV.

In some cases, interaction in blocks 708 and 712 may be a part of interactions for an interactive game with the NLP engine.

In some cases, the NLP engine may adapt to special communication circumstances detected using sensors on the AV, an output of the NLP engine (e.g., detected spoken language), or based on user profile information of the rider (e.g., expressly provided language preference, a disability indication of the rider, a passenger who speaks a different language, or a passenger who has communication difficulties (e.g., a very old/very young passenger)). In some cases, the response or reaction in block 712 may be provided in a language that matches the detected spoken language and/or the expressly provided language preference in order to offer multilingual rider service support. The determined response or reaction can be translated to the detected language (in real-time or near real-time) and output to the rider in the detected language. In some cases, the output is audio-based, and is offered through voice via one or more speakers. In some cases, the output is visual-based, and is offered through text via one or more displays.

In some cases, a parameter of the response, i.e., the speed of the synthesized speech, may be adapted based on detected speed of the rider's speech or expressly provided speech speed preference of the rider.

In some cases, a parameter of the response, i.e., the dialect or accent of the synthesized speech, may be adapted based on detected dialect or accent of the rider's speech or expressly provided dialect or accent preference of the rider.

In some cases, in block 708, the speech extracted from the parsing may indicate a certain alert condition, e.g., representing an urgent request for help from the passenger. An appropriate reaction or response to the alert condition can be determined and executed in 712. If it is determined that the alert condition can be handled locally, interaction between the passenger and the onboard assistant may continue in blocks and 712 until the interaction is complete or the alert condition is resolved to the rider's satisfaction. If it is determined that the alert condition cannot be handled locally, a third-party such as a rider service agent may be added to the conference call or a call may be initiated with the third-party with the AV operator as the moderator to resolve the alert condition (not shown in FIG. 7 but these steps are illustrated in FIGS. 4-6 and 10-11). In some cases, a designated third-party (designated for responding to the urgent request) may be added to the conference call or a call may be initiated with the designated third-party with the AV operator as the moderator to resolve the alert condition. For instance, the designated third-party may be a contact from an address book of the passenger, e.g., received from a cloud-based user information data store, or received by activating short-range radio service of a mobile device of the passenger and receiving the contact via the radio service.

In some cases, in block 708, the speech extracted from the parsing may indicate a certain alert condition, e.g., representing an emergency condition. An appropriate reaction or response to the alert condition can be determined and executed in 712. For example, a third-party such as an emergency service personnel may be added to the conference call or a call may be initiated with the third-party with the AV operator as the moderator to resolve the alert condition (not shown in FIG. 7 but these steps are illustrated in FIGS. 4-6 and 10-11).

In some cases, in block 708, the parsing of passenger speech input may be unsuccessful or an alert condition cannot be determined with sufficient confidence level (e.g., therefore indicating that the NLP engine cannot understand the speech or interpret the interaction). In some cases, in block 712, a suitable response or reaction to the parsed speech cannot be determined. In such cases, a third-party such as a rider service agent may be added to the conference call or a call may be initiated with the third-party with the AV operator as the moderator to resolve the alert condition (not shown in FIG. 7 but these steps are illustrated in FIGS. 4-6 and 10-11).

Once the interaction is complete, in block 796, the method is done.

In some alternative implementations, the NLP engine is provided by an NLP software service, and the NLP software service is added as a party to a conference call having the rider/AV as one of the parties, and the AV operator as the moderator. Accordingly, the NLP software service can process passenger speech input and can participate/respond with voice in an interaction with the rider.

Further Advantages of Using Conference Call for a Service Session

FIG. 8 is a flowchart of a method 800 of selected aspects of providing an onboard assistant. In some embodiments of an onboard assistant, all calls—or at least all calls of a certain type—may be created as conference calls. For example, any rider service calls or calls for remote assistance may be created as conference calls. This allows the AV operator to seamlessly add new participants to the call, such as a different rider service agent, a rider service expert, a rider service manager, or others. The AV operator can also add other parties to the call, such as emergency services, towing services, user contacts, or others without ever having to place the passenger on hold. When calls are created as conference calls, parties can be added and removed from the call seamlessly without interrupting the call. The AV operator in some embodiments is a back-end platform having computing systems implementing functionalities for setting up and managing the conference calls. In those embodiments, the AV operator does not require human intervention or input when managing these conference calls and participants thereof. The AV operator in these embodiments is not intended to be a human rider service representative.

In block 804, the call is initiated. The call may be initiated explicitly by the passenger, such as by pressing an onboard assistance button. Alternatively, the call may be initiated based on automated conditions as described in this specification.

In block 808, the system creates a conference call between the passenger and at least one other party. This call can be between the passenger and the AV controller, between the passenger and a personal contact, between the passenger and the AV operator, or some other party. This call may require customized interfaces that provide for every call placed via the onboard assistance subsystem to be a conference call.

In block 812, the AV operator operates and moderates the conference call. For example, the AV operator can invite others to join the call, drop parties from the call, monitor the call, and perform other services. Furthermore, the AV may provide information, such as a van or license plate, for the AV or other data specific to the AV. These data can then be provided to the AV operator, which can control and moderate distribution of the data as appropriate.

Advantageously, this can provide benefits for the passenger. For example, in a collision or critical situation, it may be stressful to put the passenger on hold. It is advantageous to create the call quickly and for the AV operator to control both ends of the call so that it is not dropped accidentally and so that other errors do not occur.

Furthermore, in moderating the conference call, the AV operator can regulate and proxy hardware information to be shared with other operators. The operator can add or remove people to the conference call without user input and without an express request. In embodiments, the AV operator may also stream sensor data, such as an interior camera feed, which can help the AV operator, rider service agent, emergency services, personnel, or others to assess the situation and provide appropriate assistance.

Embodiments of this application may be used for medical emergencies, interpersonal conflicts, and other situations. These situations may be automatically triggered by sensors within the vehicle or may be in response to an express request from a passenger, such as the passenger pressing a rider service button, or verbally asking for customer assistance, which can be handled by NLP.

During the call, the AV operator may provide information, such as car information, a reason for the call, a trigger for the call, whether there is illegal activity, whether there are prohibited items present, whether there are weapons within the vehicle, whether there are weapons being used by persons outside the vehicle, or other information.

All these data may be used to better assess the situation and help the agents operating for the various parties to successfully resolve the situation. In block 816, once the condition is resolved, the conference call may end. In some embodiments, only the AV operator can end the conference call. Neither the passenger nor third parties can end the conference call, thus allowing the AV operator to maintain control over the situation to ensure that all appropriate aid is rendered and that all situations have been resolved.

The AV operator serving as the moderator means the AV operator can provide highly specific or identifying information about the AV to assist in resolving the alert condition. For instance, the AV operator can provide to a selected party to the call data to individually identify the AV in the call, such as a vehicle identification number (VIN) or license plate number. Other examples of such data may include make and model of the AV (or other description of the AV such as the assigned name or identifier printed/painted on the AV), software version of the software running on the AV, geolocation of the AV, etc.

The AV operator serving as the moderator means the AV operator can provide highly specific or identifying information about the alert condition detected/inferred, e.g., from AV sensor data, that caused the call to be initiated to assist in resolving the alert condition. In some cases, the AV operator can provide to a selected party to the call metadata about the alert condition. In some cases, the AV operator can provide metadata or other information about a cause of the alert condition.

Additionally, the AV operator serving as the moderator means the AV operator can access highly specific or identifying information about the user to assist in resolving the alert condition. In some cases, the AV operator can communicate with a user data service, receiving information about the passenger, and adapting the resolution according to the information about the passenger.

In block 820, the method is done.

Illustrated Examples where the AV Operator Initiates a Case or Session

Figure 9:
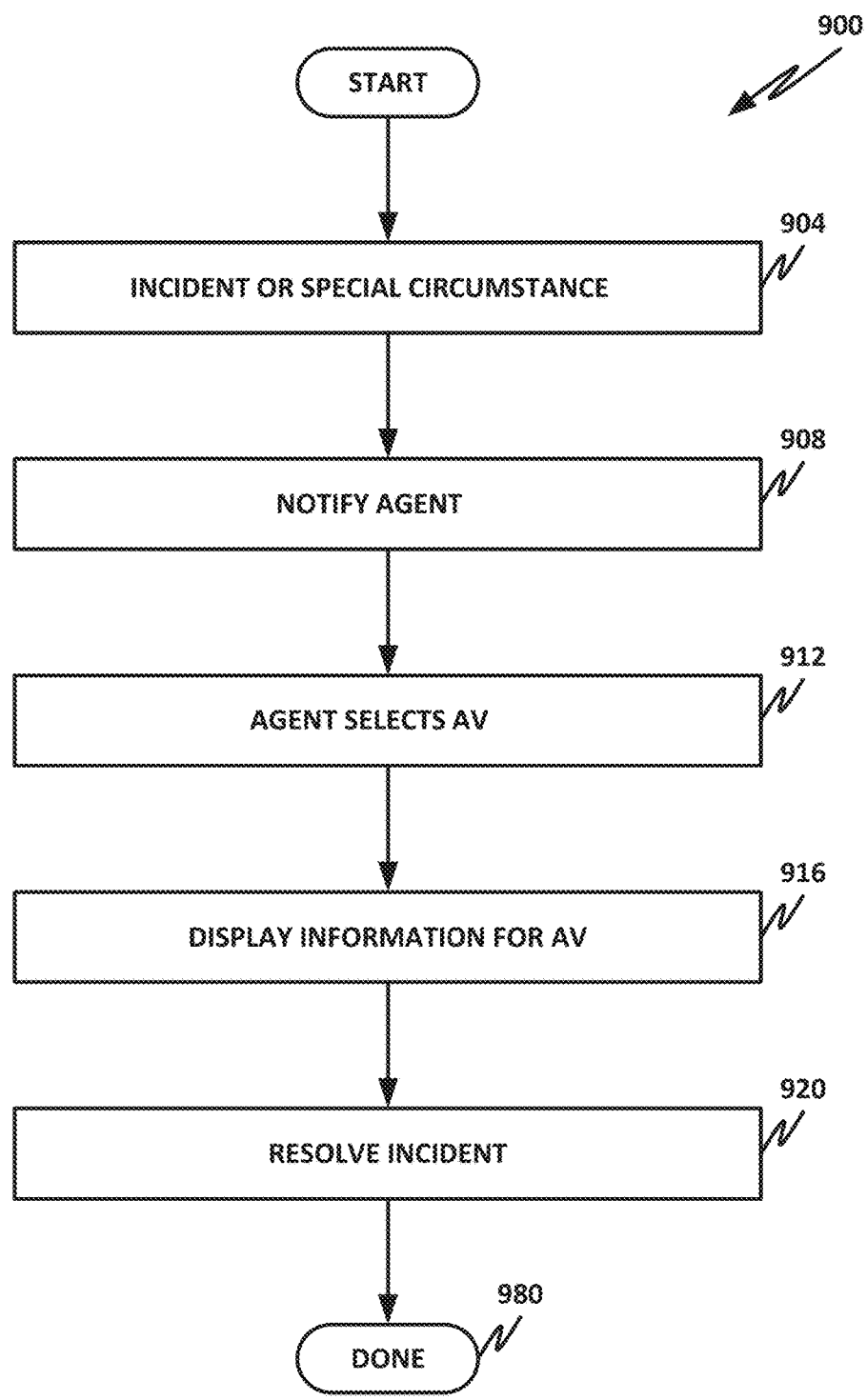
FIG. 9 is a flowchart of selected elements of a method of providing onboard assistance.

FIG. 9 is a flowchart of selected elements of a method of providing onboard assistance. In the example of method 900, the AV operator may optionally manually initiate a case with the AV or with the passenger. For example, the rider service center or AV operator can create a case or session that gives them access to the AV location, cameras, route, AV state, cabin controls, trip information, and other data as needed. This session may be explicitly initiated by a rider service agent of the AV operator based on internal or external conditions. For example, the AV operator may learn of special conditions, weather circumstances, social upheaval, or other circumstances that may require the AV operator or a rider service agent to assess the state of the AV. Alternatively, the case can be initiated by the AV itself, based on AV sensor data, or by a passenger of the AV.

In block 904, the rider service incident or special circumstances occur.

In block 908, an appropriate rider service agent is notified or becomes aware of the circumstances and desires to assess the state of the AV.

In block 912, the rider service agent may operate an interface, such as a GUI, that displays various AVs in the AV fleet. This GUI could include a list display or a map-based display that illustrates the position of the various AVs according to their GPS coordinates. To get information on a particular AV, the rider service agent may zoom in on or select a particular AV. The rider service agent can do this even though the AV has not reported a problem or special circumstance. Thus, even if there is nothing actively wrong with the AV and the AV continues to operate autonomously or normally, the rider service agent may have a reason for needing more information about the AV. Thus, the rider service agent selects the appropriate AV from the GUI.

In block 916, the system requests data from the remote AV, such as VIN, serial number, license plate number, name or identifier of the AV, software version information, route, trip information, passenger data, sensor data, camera feeds (from an interior or exterior camera of the AV), or others. The AV may, in response to this request, stream the requested data to the rider service center for review by the rider service agent. Some data may also be retrieved from third-party data sources, such as a cloud service, an application store, or others. The data may be used to infer an incident of the AV.

In block 920, the rider service agent may take suitable steps are necessary to address and resolve the incident, or whatever motivation the rider service agent had for viewing details about the AV. The system can cause a resolution to be executed to address an incident of the AV caused by the external condition.

Once the incident is resolved, in block 980, the method is done.

Continuous Monitoring of the AV to Detect and Resolve an Alert Condition

Figure 10:
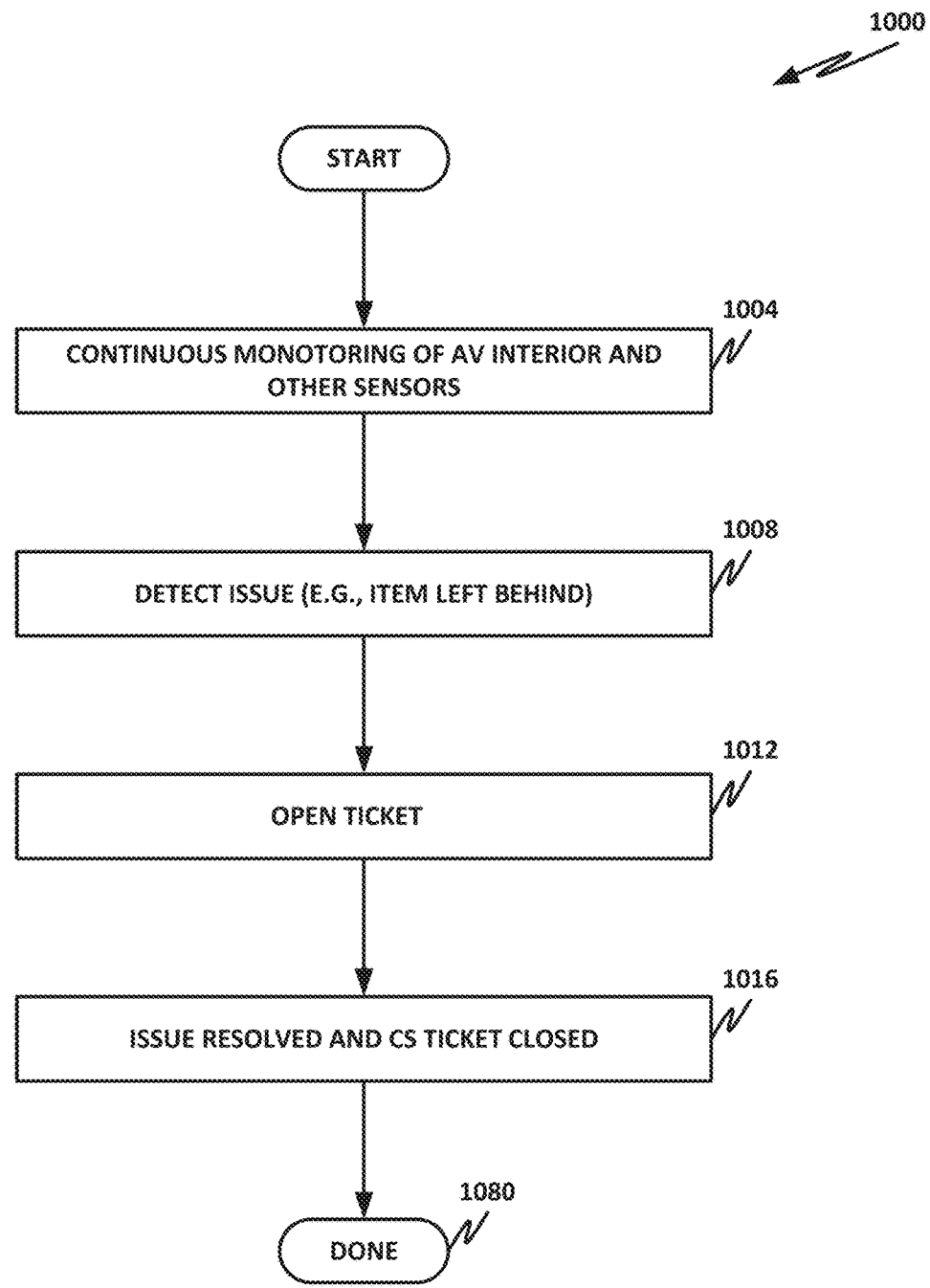
FIG. 10 is a flowchart of selected elements of a method of providing an onboard assistant.

FIG. 10 is a flowchart of selected elements of a method 1000 of providing an onboard assistant.

In some examples, an AV interior camera and other sensors (such as a seat weight sensor) may continuously monitor conditions within the AV. The system may also automatically report an issue when and if it occurs. When an issue is detected, the onboard assistant may create a case and connect to a rider service agent to resolve the issue. Alternatively, in some examples, the onboard assistant may be able to proactively resolve the issue itself.

In an illustrative example, a camera may detect that an item was left behind by a passenger. If the passenger is still in the vicinity, the AV may try to get the rider's attention, or the mobile application may send the rider a notification. This made enable the passenger to retrieve the item left behind before leaving the AV.

If the rider still doesn't notice, the AV may create a case or session and may designate the item for safekeeping and offer information to the rider on how to retrieve the item.

In another illustrative embodiment, the camera may detect that there is an unauthorized or unwanted person within the vehicle. The rider service agent may connect to the car and help to resolve the issue. If the unauthorized person is intended to be a passenger, then the rider service agent may help the initial passenger to add the new rider's fare to the trip. Alternatively, if the unauthorized person should not be in the AV and may even be a threat to the passenger, then the rider service agent can take appropriate actions, such as remaining on the line, dispatching emergency services, placing a 911 call, or taking other corrective action. In some cases, the AV may detect that an unauthorized person is attempting to enter the vehicle and may take preventative measures, such as locking the doors, rolling up windows, or other.

In another example, the camera may detect that someone is sick or having a heart attack or is otherwise distressed. In that case, a rider service ticket may be opened, and the AV or the rider service agent may contact first responders and dispatch aid to help the passenger.

In yet another example, the camera may detect that the passenger is violating a rule, such as not wearing a mask in a jurisdiction where masking is required, the passenger is eating or drinking in the car, the passenger is damaging or acting carelessly in the vehicle, or other violations. The sensors may also detect a safety related issue and appropriately address it.

In block 1004, the AV onboard assistant continuously monitors the AV interior, exterior, and other sensors to watch for certain conditions, such as those illustrated above.

In block 1008, the onboard assistant detects an issue (e.g., an alert condition), such as an item left behind, an unauthorized person, an attempted entry into the AV, a sick or injured person, a passenger violating rules, or other condition.

In block 1012, the onboard assistant opens a rider service ticket and may contact an appropriate party, such as a rider service center, a rider service agent, emergency personnel, first responders, or others. In some cases, the onboard assistant may attempt to contact the passenger, either via external speakers or via a notification on the ride-hail app, or other means. The onboard assistant, rider service agent, or other party can thus address and resolve the issue as appropriate. In block 1016, the issue is resolved and the rider service ticket is closed.

In block 1080, the method is done.

Figure 11:
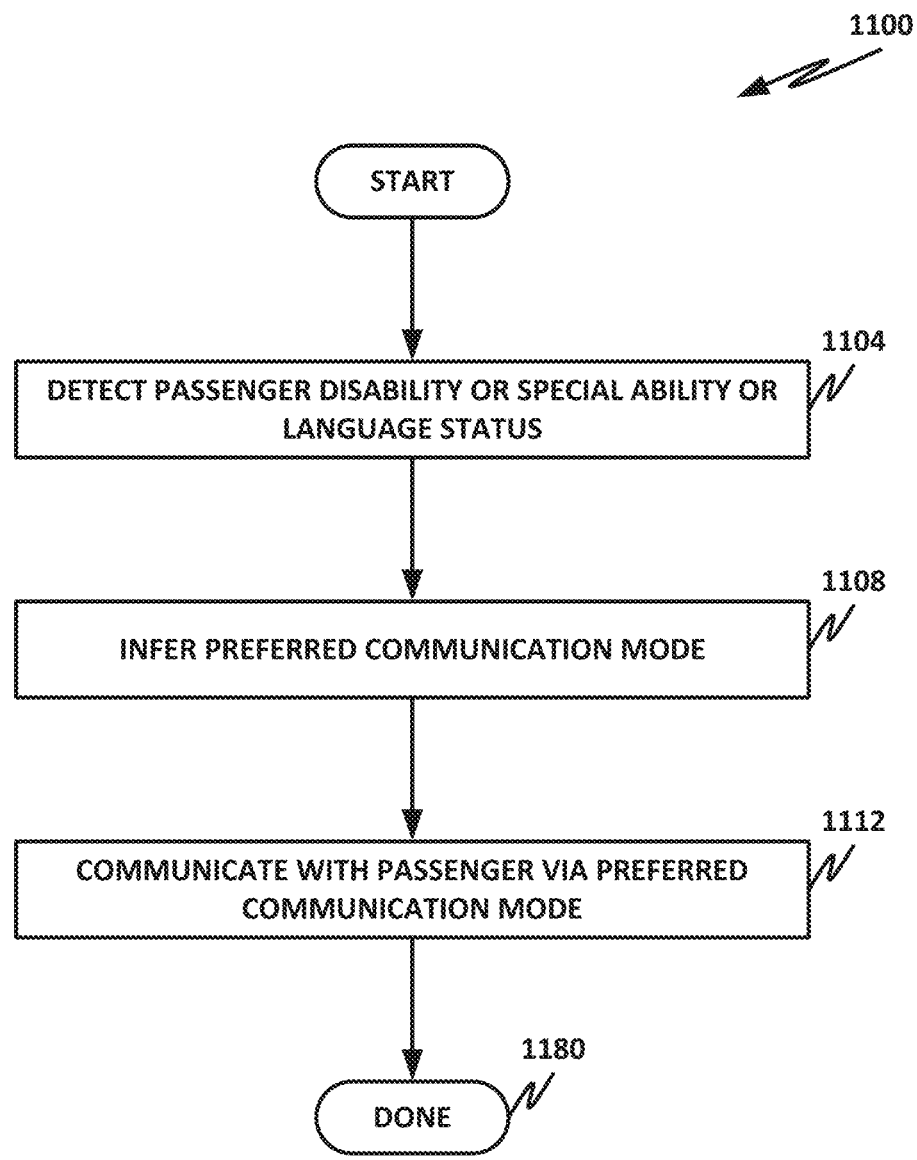
FIG. 11 is a flowchart of selected elements of a method of providing an onboard assistant.

Adapting Resolution of an Alert Condition Based on a Detected Disability, Accessibility Need, or Preference FIG. 11 is a flowchart of selected elements of a method 1100 of providing an onboard assistant that can adapt resolutions and/or interactions with a passenger based on accessibility needs or preferences of a passenger or other needs/preferences. Method 1100 can be used to provide effective onboard assistance to passengers with a special communication status, such as a disability, a foreign language, or other. For example, if the AV encounters an issue and needs to automatically connect the rider service center to the rider, the onboard assistant may receive explicit customer preferences for disability status, language, or other, or may infer special communication status based on its sensors. The onboard assistant may also infer or determine a special communication status via a third-party data service, such as a ride-hail application or other data service.

In block 1104, the AV onboard assistant may detect or receive a special communication status, such as a disability, special ability status, or language status. As described above, this may be expressly provided by the customer, provided via a third-party data service, or inferred via sensors. For example, if the passenger does not respond to audible prompts, then the onboard assistant may infer that the passenger is hard of hearing. If the onboard assistant can infer, such as from the passenger's motions as detected by an interior camera (e.g., the passenger uses sign language to communicate), that the passenger is visually impaired, then appropriate accommodations may be provided. In another example, an NLP engine with multilingual capabilities may listen to the passenger's speech patterns and infer a preferred spoken language.

In block 1108, based on the provided inputs, the onboard assistant may infer and select an appropriate communication mode.

In some embodiments, inferring the passenger's communication preferences may include operating an algorithm to determine those preferences based on audible, visual, or other inputs.

In block 1112, the onboard assistant may communicate with the passenger via the preferred communication mode (e.g., expressly designated communication mode in the user profile information of the rider) or a detected communication mode suitable for the passenger (e.g., detected or inferred from AV onboard sensors).

In some cases, the preferred communication mode or detected communication mode may be dependent on the environmental conditions of the AV or conditions or settings of the cabin of the AV. If the ambient noise is very loud, the communication mode may be visual. If there is low visibility in the cabin or it is not preferable to have a bright display screen on due to certain night time cabin settings, the communication mode may be audible.

For example, if the passenger is hard of hearing, the onboard assistant may communicate with the passenger via a visual text interface or textual GUI on the onboard tablet or a suitable human-readable display. Alternatively, if the onboard assistant is programmed with an automated sign language driver, then the onboard assistant may attempt to communicate with the passenger via visual sign language cues.

Similarly, if the passenger is determined to be visually impaired, then the onboard assistant may communicate audibly (using a text-to-speech engine) or via an automated/dynamic braille interface. For visually impaired passengers, tactile buttons (buttons distinguishable by touch or haptics) may be provided for the passengers to interact with rider service support.

If the passenger has a different language preference, then the onboard assistant may attempt to communicate via that language. Furthermore, the onboard assistant may attempt to connect the passenger with a rider service agent known to speak the preferred language.

Other adaptations may include assistance in communicating with people of a specific age group or demographic, children or elderly persons, such as by modifying speech patterns, volume, or other to better accommodate these passengers.

In some embodiments, adapted communication preferences may be used to convey critical information to help ensure that the passenger receives critical notifications. For example, if the AV needs to stop early, reroute, or make an alteration, then the notification may be appropriately moderated to ensure that the passenger receives the message.

Furthermore, in some embodiments, a preferential modality may be used to confirm with the passenger that he or she has seen, heard, or otherwise received the message. This can be useful to help ensure that two-way communication has been established, and to verify that the passenger has received critical information.

In block 1180, once the AV has successfully inferred the passenger's communication preferences and provided and verified effective communication, the method is done.

Exemplary Hardware Platform

FIG. 12 is a block diagram of a hardware platform 1200. Although a particular configuration is illustrated here, there are many different configurations of hardware platforms, and this embodiment is intended to represent the class of hardware platforms that may provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Hardware platform 1200 may provide a suitable structure for controller 104 of FIG. 1, for AV controller 200 of FIG. 2, for carrying out the functionalities and systems illustrated in FIGS. 5-11, as well as for other computing elements illustrated throughout this specification, including elements external to AV 102. Depending on the embodiment, elements of hardware platform 1200 may be omitted, and other elements may be included.

Hardware platform 1200 is configured to provide a computing device. In various embodiments, a "computing device" may be or comprise, by way of non-limiting example, a computer, system-on-a-chip (SoC), workstation, server, mainframe, virtual machine (whether emulated or on a "bare metal" hypervisor), network appliance, container, a data center, a communications service provider infrastructure, an in-memory computing environment, a computing system of a vehicle (e.g., an automobile or airplane), embedded computer, embedded controller, embedded sensor, smart phone, tablet computer, wearable computer, or any other electronic device for processing and communicating data. At least some of the methods and systems disclosed in this specification may be embodied by or carried out on a computing device.

In the illustrated example, hardware platform 1200 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus 170 of FIG. 1, although in some embodiments they may interconnect with one another.

Hardware platform 1200 is an example of a platform that may be used to implement embodiments of the teachings of this specification. For example, instructions could be stored in storage 1250. Instructions could also be transmitted to the hardware platform in an ethereal form, such as via a network interface, or retrieved from another source via any suitable interconnect. Once received (from any source), the instructions may be loaded into memory 1204, and may then be executed by one or more processor 1202 to provide elements such as an operating system (OS) 1206, control functions 1208, or data 1212.

Hardware platform 1200 may include several processors 1202. For simplicity and clarity, only processors PROC0 1202-1 and PROC1 1202-2 are shown. Additional processors (such as 2, 4, 12, 16, 24, 32, 64, or 128 processors) may be provided as necessary, while in other embodiments, only one processor may be provided. Processors 1202 may be any type of processor and may communicatively couple to chipset 1216 via, for example, PtP interfaces. Chipset 1216 may also exchange data with other elements. In alternative embodiments, any or all of the PtP links illustrated in FIG. 12 could be implemented as any type of bus, or other configuration rather than a PtP link. In various embodiments, chipset 1216 may reside on the same die or package as a processor 1202 or on one or more different dies or packages. Each chipset may support any suitable number of processors 1202. A chipset 1216 (which may be a chipset, uncore, Northbridge, Southbridge, or other suitable logic and circuitry) may also include one or more controllers to couple other components to one or more central processor units (CPU).

Two memories, 1204-1 and 1204-2 are shown, connected to PROC0 1202-1 and PROC1 1202-2, respectively. As an example, each processor is shown connected to its memory in a direct memory access (DMA) configuration, though other memory architectures are possible, including ones in which memory 1204 communicates with a processor 1202 via a bus. Memory 1204 may include any form of volatile or nonvolatile memory. Memory 1204 may be used for short, medium, and/or long-term storage. Memory 1204 may store any suitable data or information utilized by platform logic. In some embodiments, memory 1204 may also comprise storage for instructions that may be executed by the cores of processors 1202 or other processing elements (e.g., logic resident on chipsets 1216) to provide functionality. In certain embodiments, memory 1204 may comprise a relatively low-latency volatile main memory, while storage 1250 may comprise a relatively higher-latency nonvolatile memory. However, memory 1204 and storage 1250 need not be physically separate devices, and in some examples may simply represent a logical separation of function (if there is any separation at all).

Certain computing devices provide main memory 1204 and storage 1250, for example, in a single physical memory device, and in other cases, memory 1204 and/or storage 1250 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that may coordinate to achieve a logical operation.

Chipset 1216 may be in communication with a bus 1228 via an interface circuit. Bus 1228 may have one or more devices that communicate over it, such as a bus bridge 1232, I/O devices 1235, accelerators 1246, and communication devices 1240, by way of non-limiting example. In general terms, the elements of hardware platform 1200 may be coupled together in any suitable manner. For example, a bus may couple any of the components together.

Communication devices 1240 may broadly include any communication not covered by a network interface and the various I/O devices described herein. Devices may include, serial or parallel devices that provide communications. In a particular example, communication device 1240 may be used to stream and/or receive data within a CAN.

I/O devices 1235 may be configured to interface with any auxiliary device that connects to hardware platform 1200 but that is not necessarily a part of the core architecture of hardware platform 1200. A peripheral may be operable to provide extended functionality to hardware platform 1200 and may or may not be wholly dependent on hardware platform 1200. Peripherals may include input and output devices such as displays, terminals, printers, keyboards, mice, modems, data ports, network controllers, optical media, external storage, sensors, transducers, actuators, controllers, data acquisition buses, cameras, microphones, speakers, or external storage, by way of non-limiting example.

Bus bridge 1232 may be in communication with other devices such as a keyboard/mouse 1238 (or other input devices such as a touch screen, trackball, etc.), communication devices 1240 (such as modems, network interface devices, peripheral interfaces such as PCI or PCIe, or other types of communication devices that may communicate through a network), and/or accelerators 1246. In alternative embodiments, any portions of the bus architectures could be implemented with one or more PtP links.

OS 1206 may be an embedded or real-time operating system. In some embodiments, a hardware platform 1200 may function as a host platform for one or more guest systems that invoke application (e.g., control functions 1208).

Control functions 1208 may include one or more computing engines that may include one or more non-transitory computer-readable mediums having stored thereon executable instructions operable to instruct a processor to provide operational functions (e.g., functions illustrated in FIGS. 5-11). At an appropriate time, such as upon booting hardware platform 1200 or upon a command from OS 1206 or a user or security administrator, a processor 1202 may retrieve a copy of the operational agent (or software portions thereof) from storage 1250 and load it into memory 1204. Processor 1202 may then iteratively execute the instructions of control functions 1208 to provide the desired methods or functions.

There are described throughout this specification various engines, modules, agents, servers, applications, or functions. Each of these may include any combination of one or more logic elements of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. The engine may also include other hardware, software, and/or data, including configuration files, registry entries, application programming interfaces (APIs), and interactive or user-mode software by way of non-limiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language. These may be used with any compatible operating systems or operating environments. Hardware elements may be designed manually, or with a hardware description language. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Communication devices 1240 may communicatively couple hardware platform 1200 to a wired or wireless network or fabric. A "network," as used throughout this specification, may include any communicative platform operable to exchange data or information within or between computing devices. A network interface may include one or more physical ports that may couple to a cable (e.g., an Ethernet cable, other cable, or waveguide), or a wireless transceiver.

In some cases, some or all of the components of hardware platform 1200 may be virtualized, in particular the processor(s) and memory. For example, a virtualized environment may run on OS 1206, or OS 1206 could be replaced with a hypervisor or virtual machine manager. In this configuration, a virtual machine running on hardware platform 1200 may virtualize workloads. A virtual machine in this configuration may perform essentially all the functions of a physical hardware platform.

In a general sense, any suitably configured processor may execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 12 may be combined in a SoC architecture or in any other suitable configuration. For example, embodiments disclosed herein may be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Variations and Implementations

AVs may also be used for many other purposes, including by way of illustrative and non-limiting example, personal vehicles (which may be fully autonomous, or provide hybrid autonomous/driver assist modes), automated cargo vehicles, delivery drones, autonomous trains, autonomous aircraft, or similar. Any such vehicle may benefit from an onboard assistant as described in this specification.

As will be appreciated by one skilled in the art, aspects of the present disclosure, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a circuit, module, or system. In at least some cases, a circuit may include the physical hardware of the circuit, plus any hardware or firmware that programs or configures the circuit. For example, a network circuit may include the physical network interface circuitry, as well as the logic (software and firmware) that provides the functions of a network stack.

Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The foregoing detailed description presents various descriptions of specific certain embodiments. However, the innovations described herein may be embodied in a multitude of different ways, for example, as defined and covered by the claims and/or select examples. In the following description, reference is made to the drawings where like reference numerals may indicate identical or functionally similar elements. It will be understood that elements illustrated in the drawings are not necessarily drawn to scale. Moreover, it will be understood that certain embodiments may include more elements than illustrated in a drawing and/or a subset of the elements illustrated in a drawing. Further, some embodiments may incorporate any suitable combination of features from two or more drawings.

The preceding disclosure describes various illustrative embodiments and examples for implementing the features and functionality of the present disclosure. While components, arrangements, and/or features are described below in connection with various example embodiments, these are merely examples used to simplify the present disclosure and are not intended to be limiting.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The "means for" in these instances (above) may include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What is claimed is:

1. A method of operating an autonomous vehicle (AV) fleet for a ride-hail service, comprising:
   receiving information from a first AV, the information including: an indication of an external condition occurring, and a non-recoverable characterization of the external condition by an onboard assistant of the first AV:
   in response to the information of the external condition occurring, notifying a rider service agent of the external condition;
   generating a graphical user interface that displays AVs in a fleet of AVs providing the ride-hail service;
   receiving a selection of a second AV through the graphical user interface;
   creating a case for the second AV in response to the selection;
   streaming information of the second AV to the rider service agent for display via the graphical user interface, including a recoverable characterization of the external condition by an onboard assistant of the second AV; and
   causing a resolution to be executed to address an incident of the second AV caused by the external condition, the resolution including modifying an autonomous vehicle driving behavior of the second AV.

2. The method of claim 1, wherein creating the case for the second AV comprises creating the case in absence of a reported problem with the second AV.

3. The method of claim 1, wherein creating the case for the second AV comprises creating the case while the second AV operates normally.

4. The method of claim 1, wherein the information of the second AV includes a vehicle identification number.

5. The method of claim 1, wherein the information of the second AV includes a license plate number.

6. The method of claim 1, wherein the information of the second AV includes a camera feed from an interior camera of the second AV or an exterior camera of the second AV.

7. The method of claim 1, wherein the information of the second AV includes trip information and/or passenger data.

8. The method of claim 1, wherein the external condition comprises weather circumstances, and/or social upheaval.

9. An autonomous vehicle (AV) operator for a ride-hail service, comprising a processor circuit, a memory, and instructions encoded within the memory to instruct the processor circuit to:
   receive information from a first autonomous vehicle (AV), the information including: an indication of an external condition occurring, and a non-recoverable characterization of the external condition by an onboard assistant of the first AV;
   in response to the information of the external condition occurring, notify a rider service agent of the external condition;
   generate a graphical user interface that displays AVs in a fleet of AVs providing the ride-hail service;
   receive a selection of a second AV through the graphical user interface;
   create a case for the second AV in response to the selection;
   stream information of the second AV to the rider service agent for display via the graphical user interface, including a recoverable characterization of the external condition by an onboard assistant of the second AV; and
   cause a resolution to be executed to address an incident of the second AV caused by the external condition, the resolution including modifying an autonomous vehicle driving behavior of the second AV.

10. The AV operator of claim 9, wherein creating the case for the second AV comprises creating the case in absence of a reported problem with the second AV.

11. The AV operator of claim 9, wherein creating the case for the second AV comprises creating the case while the second AV operates normally.

12. The AV operator of claim 9, wherein the information of the second AV includes a vehicle identification number.

13. The AV operator of claim 9, wherein the information of the second AV includes a license plate number.

14. The AV operator of claim 9, wherein the information of the second AV includes a camera feed from an interior camera of the second AV or an exterior camera of the second AV.

15. The AV operator of claim 9, wherein the information of the second AV includes trip information and/or passenger data.

16. The AV operator of claim 9, wherein the external condition comprises weather circumstances, and/or social upheaval.

17. One or more non-transitory computer-readable storage media having stored thereon executable instructions to cause a processor to:
   receive information from a first autonomous vehicle (AV), the information including: an indication of an external condition occurring, a non-recoverable characterization of the external condition by an onboard assistant of the first AV, an alternative destination location determined by the onboard assistant of the first AV, and a preferred alternative destination location of a passenger of the first AV:
   in response to the information of the external condition occurring, notify a rider service agent of the external condition;
   generate a graphical user interface that displays AVs in a fleet of AVs providing a ride-hail service;
   receive a selection of a second AV through the graphical user interface;
   create a case for the second AV in response to the selection;
   stream information of the second AV to the rider service agent for display via the graphical user interface, including a recoverable characterization of the external condition by an onboard assistant of the second AV; and
   cause a resolution to be executed to address an incident of the second AV caused by the external condition, the resolution including modifying an autonomous vehicle driving behavior of the second AV.

18. The one or more non-transitory computer-readable storage media of claim 17, wherein creating the case for the second AV comprises creating the case in absence of a reported problem with the second AV.

19. The one or more non-transitory computer-readable storage media of claim 17, wherein creating the case for the second AV comprises creating the case while the second AV operates normally.

20. The one or more non-transitory computer-readable storage media of claim 17, wherein the external condition comprises weather circumstances, and/or social upheaval.

* * * * *